United States Patent
Watanabe et al.

(10) Patent No.: US 7,848,575 B2
(45) Date of Patent: Dec. 7, 2010

(54) IMAGING APPARATUS

(75) Inventors: Nobuyuki Watanabe, Yokohama (JP); Hiroyuki Minakata, Hachioji (JP); Shinichi Mihara, Tama (JP); Fumiyuki Shiratani, Sagamihara (JP); Noriyuki Iyama, Hachioji (JP)

(73) Assignee: Olympus Corporation, Tokyo (JP)

( * ) Notice: Subject to any disclaimer, the term of this patent is extended or adjusted under 35 U.S.C. 154(b) by 1454 days.

(21) Appl. No.: 11/245,609

(22) Filed: Oct. 6, 2005

(65) Prior Publication Data
US 2006/0221213 A1 Oct. 5, 2006

(30) Foreign Application Priority Data
Oct. 13, 2004 (JP) .............................. 2004-299199

(51) Int. Cl.
G06K 9/46 (2006.01)
G06K 9/66 (2006.01)
G06K 9/32 (2006.01)
H04N 5/262 (2006.01)

(52) U.S. Cl. ........................ 382/192; 382/194; 382/298; 382/299; 382/300; 348/240.99; 348/240.1; 348/240.2; 348/240.3

(58) Field of Classification Search ................. 382/192, 382/194, 298, 299, 300; 348/240.99, 240.1, 348/240.2, 240.3
See application file for complete search history.

(56) References Cited

U.S. PATENT DOCUMENTS

| | | | |
|---|---|---|---|
| 6,876,386 B1 * | 4/2005 | Ito ........................... | 348/240.1 |
| 7,023,623 B2 | 4/2006 | Miyatake et al. | |
| 7,046,290 B2 * | 5/2006 | Nozaki ....................... | 348/350 |
| 7,113,209 B2 * | 9/2006 | Asada ...................... | 348/240.1 |
| 7,142,237 B2 * | 11/2006 | Nozawa .................... | 348/240.2 |
| 7,602,405 B2 * | 10/2009 | Hsu .......................... | 345/629 |
| 7,602,425 B2 * | 10/2009 | Ishii ......................... | 348/240.1 |
| 2001/0040630 A1 | 11/2001 | Matsuzaka | |
| 2002/0154912 A1 | 10/2002 | Koseki | |
| 2002/0191866 A1 * | 12/2002 | Tanabe ....................... | 382/298 |
| 2004/0095485 A1 * | 5/2004 | Ueda et al. ............... | 348/240.1 |

(Continued)

FOREIGN PATENT DOCUMENTS

JP  6-339083 A  12/1994

(Continued)

OTHER PUBLICATIONS

Japanese Office Action dated Jul. 13, 2010 and English translation thereof, issued in counterpart Japanese Application No. 2004-299199.

Primary Examiner—John B Strege
(74) Attorney, Agent, or Firm—Holtz, Holtz, Goodman & Chick, PC

(57) ABSTRACT

An imaging apparatus has the function of an optical zoom which optically converts the magnification of an image and the function of an electronic zoom which changes the size of an image by electrical signal processing. The function of the electronic zoom at least operates when the optical zoom is not set at the telephoto end. A total magnification is determined by changing magnification by the optical zoom and changing magnification by the electronic zoom. A pixel count s1 of an electronic imaging device, a pixel count s2 of a rectangle including the pixels on an imaging device which are used by the electronic zoom, and a pixel count s3 of an output satisfy $s1 \geq s2 > s3$ or $s1 > s2 \geq s3$.

18 Claims, 18 Drawing Sheets

U.S. PATENT DOCUMENTS

2004/0189830 A1 * 9/2004 Pollard .................... 348/240.1

FOREIGN PATENT DOCUMENTS

| | | |
|---|---|---|
| JP | 10-42183 A | 2/1998 |
| JP | 2000-295530 A | 10/2000 |
| JP | 2001-136436 A | 5/2001 |
| JP | 2002-314868 A | 10/2002 |
| JP | 2003-283910 A | 10/2003 |
| WO | 03/085440 A1 | 10/2003 |

* cited by examiner

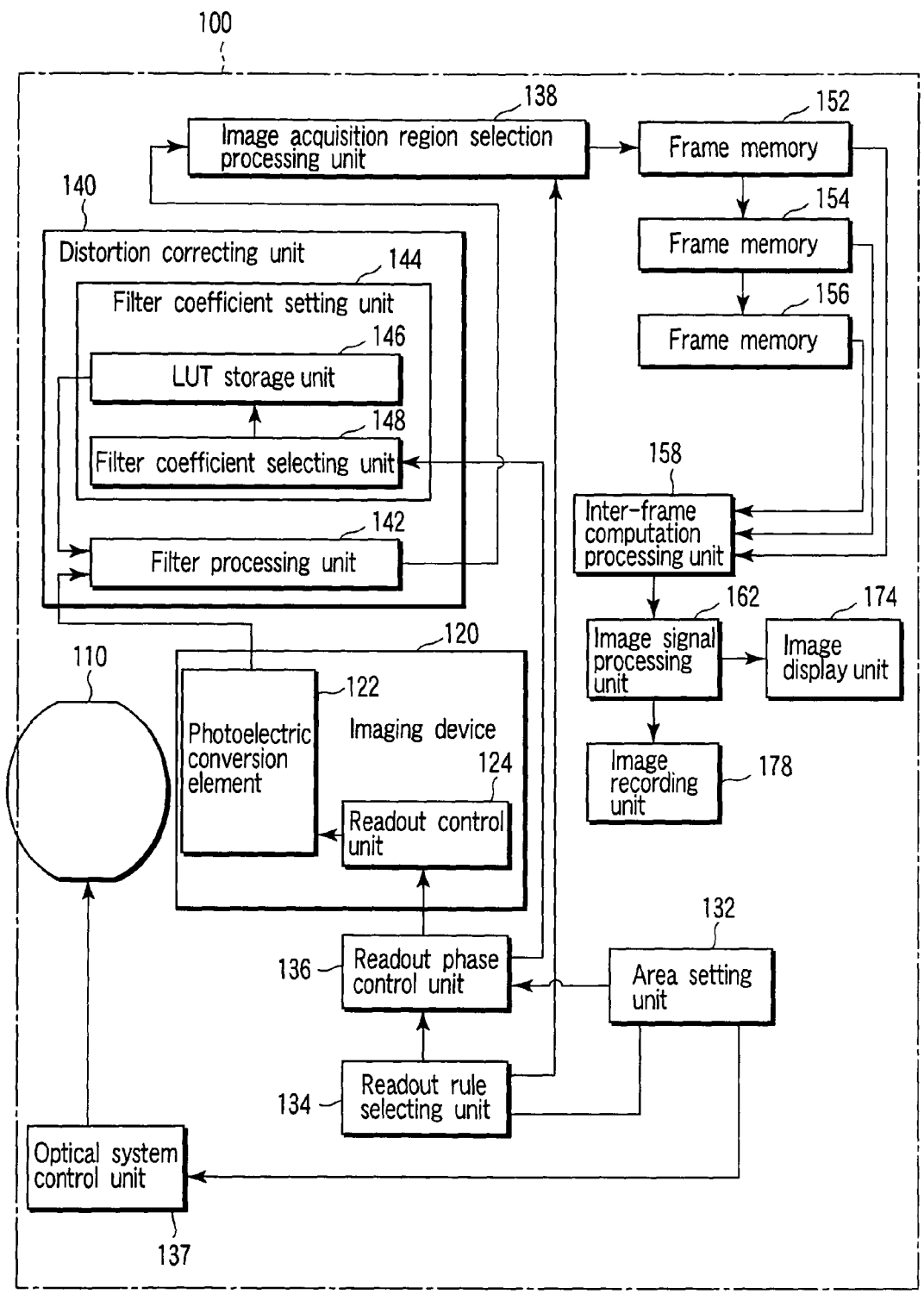
F I G. 4

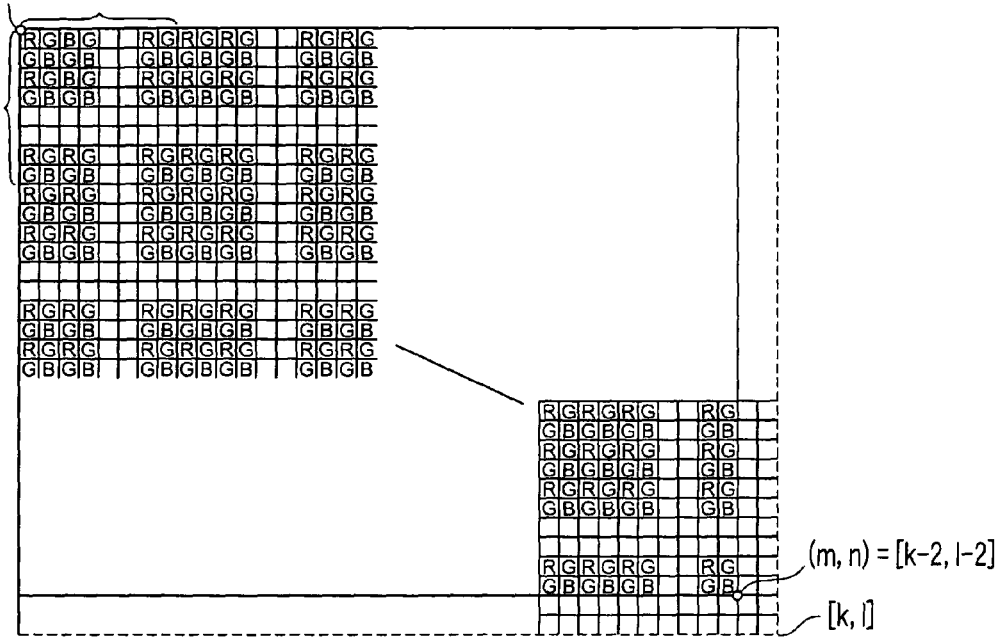
F I G. 9
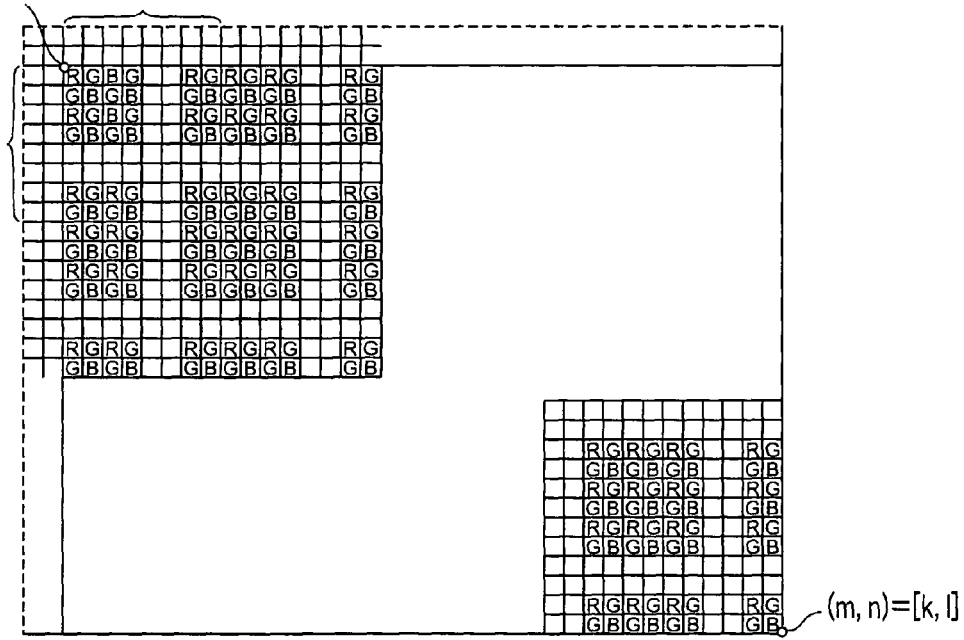
F I G. 10

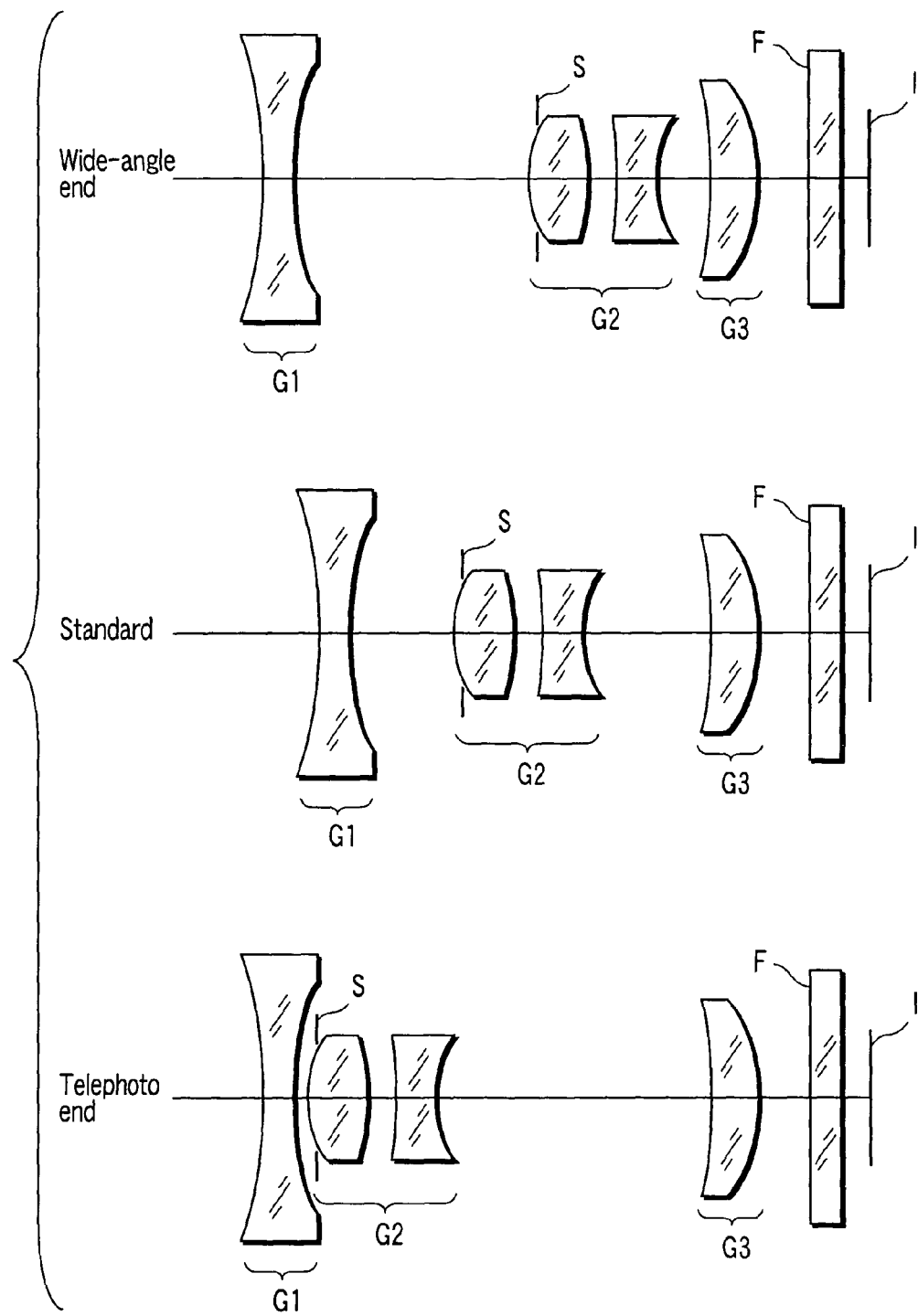
F I G. 11

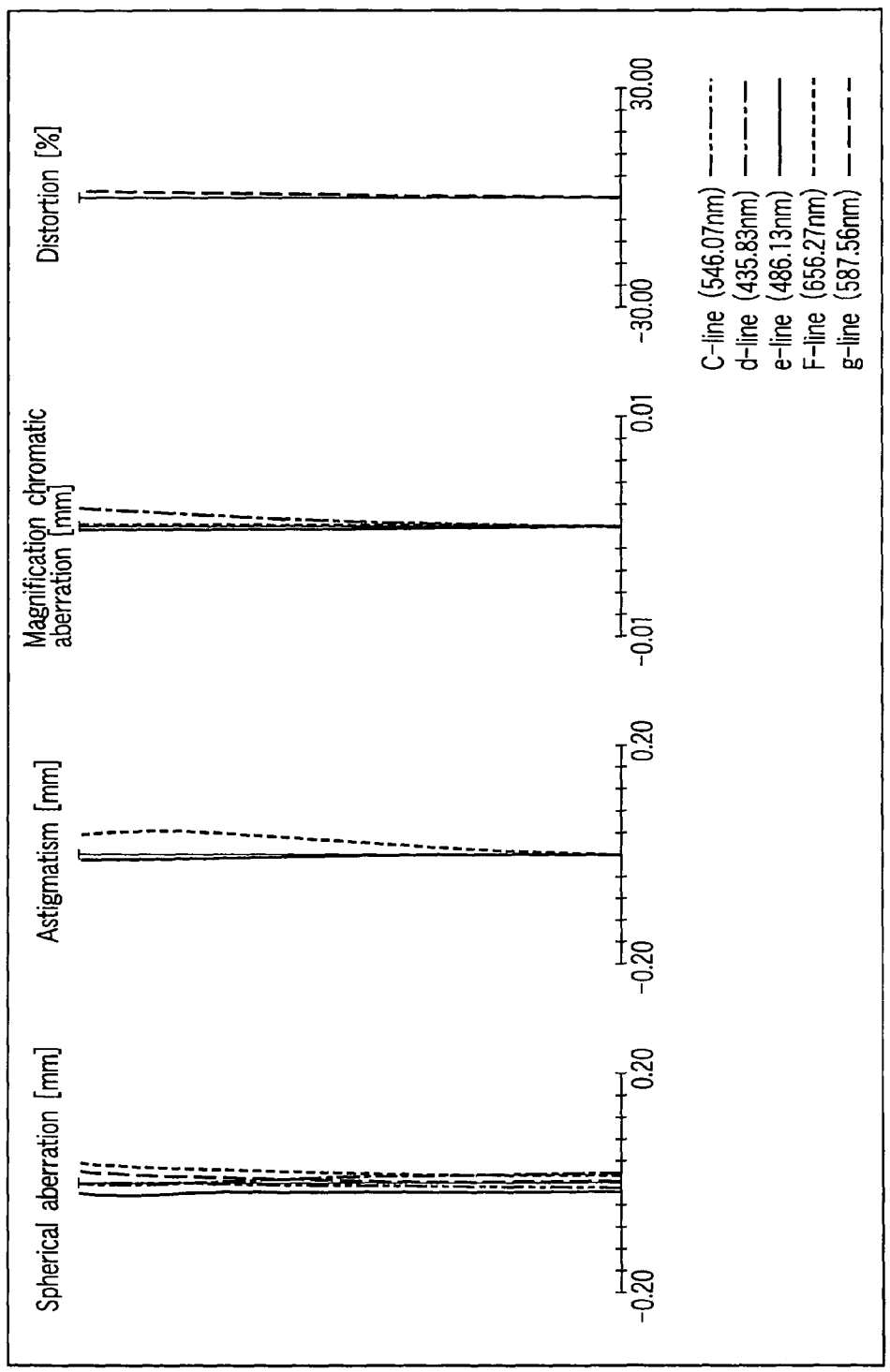
F I G. 14

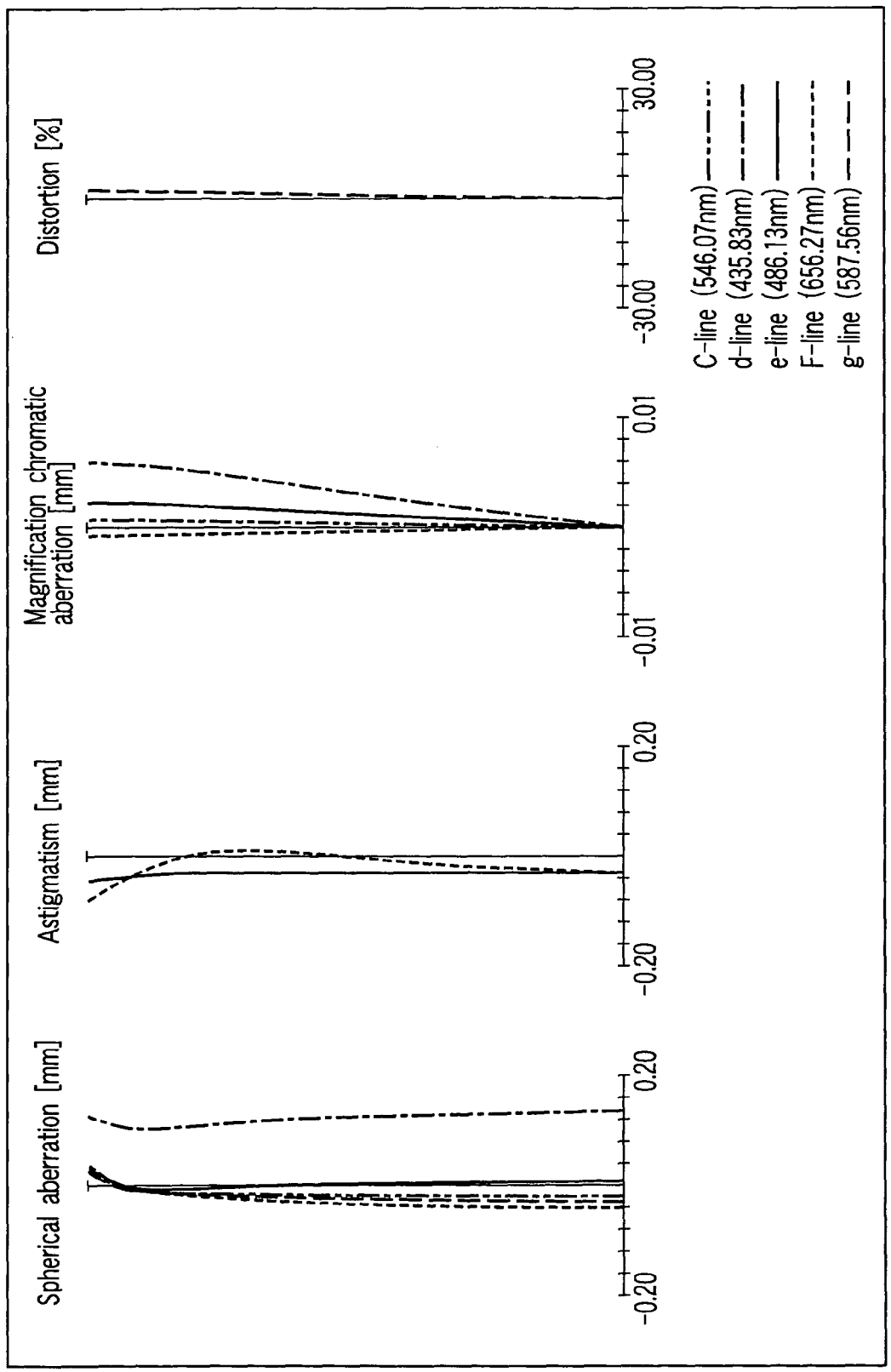
F I G. 15

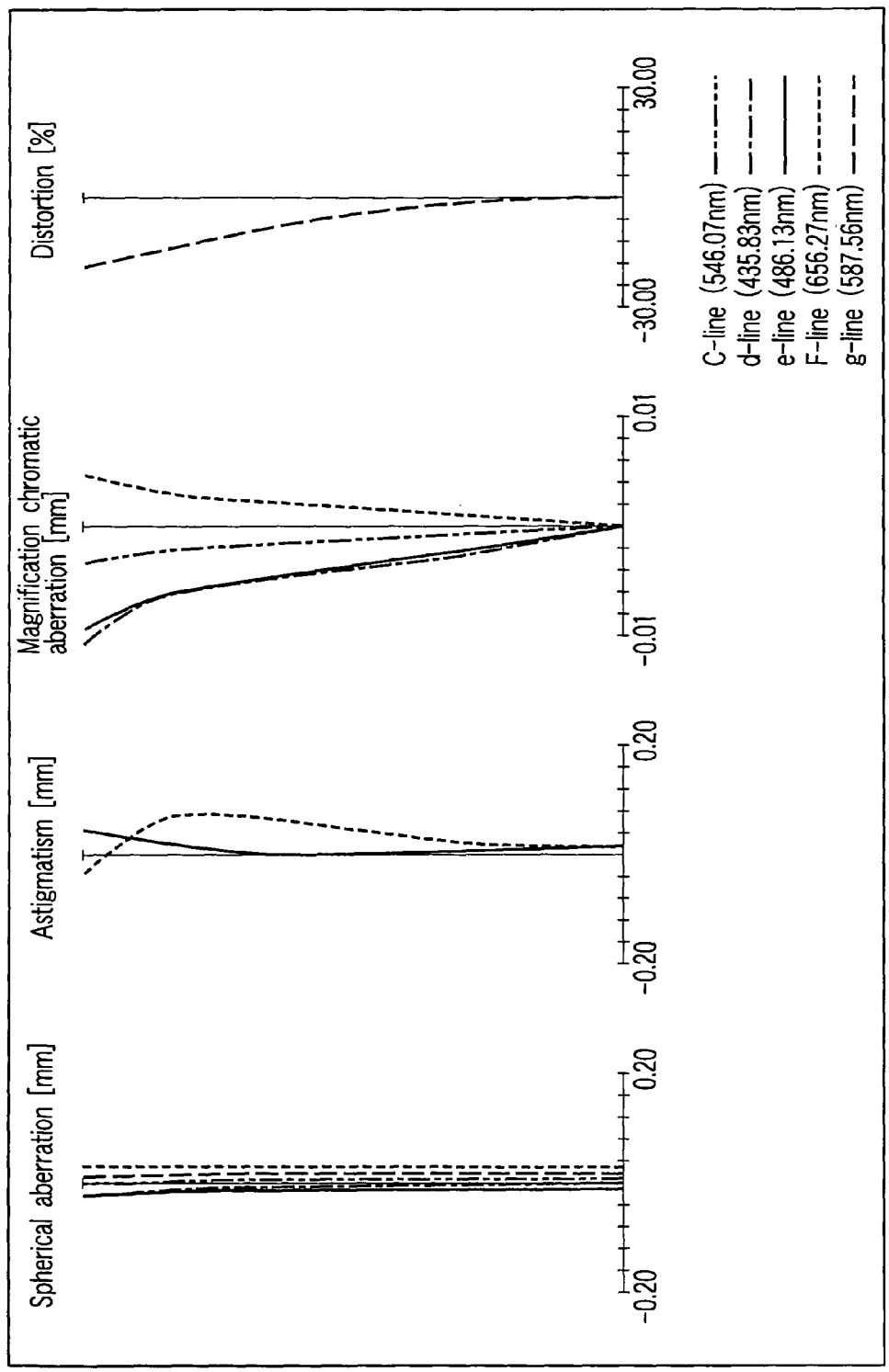
F I G. 17

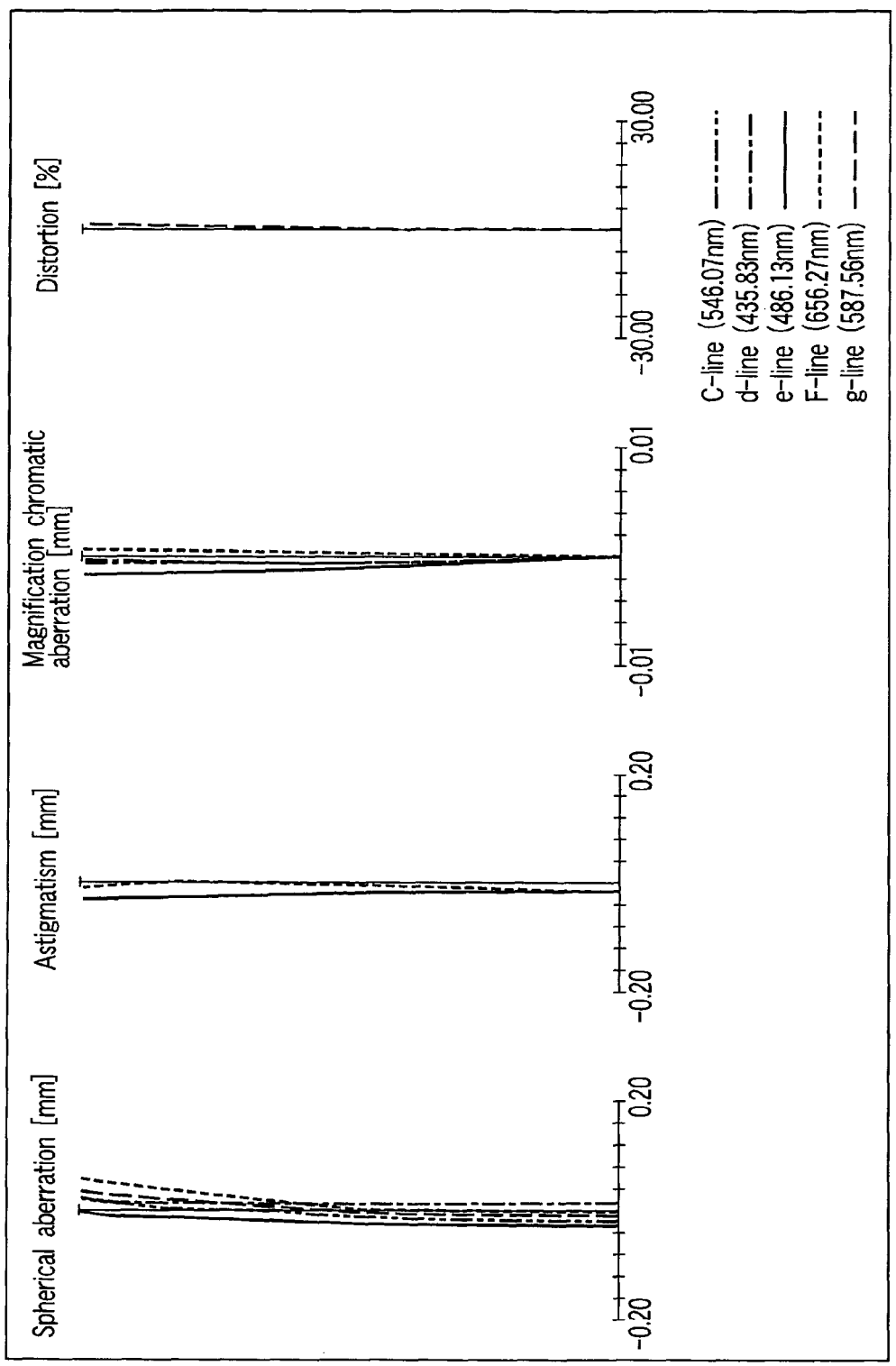
F I G. 19

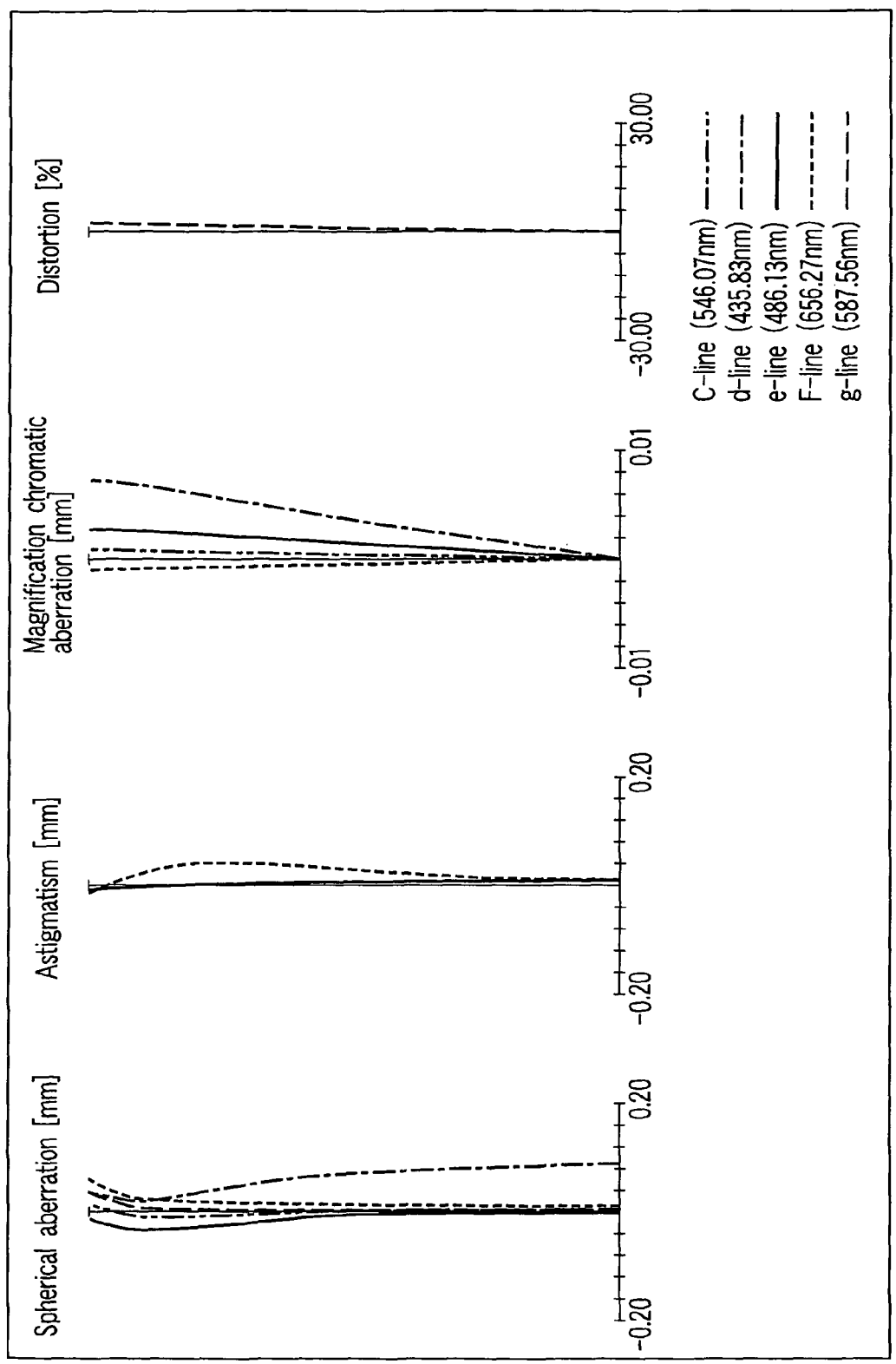
F I G. 20

IMAGING APPARATUS

CROSS-REFERENCE TO RELATED APPLICATIONS

This application is based upon and claims the benefit of priority from prior Japanese Patent Application No. 2004-299199, filed Oct. 13, 2004, the entire contents of which are incorporated herein by reference.

BACKGROUND OF THE INVENTION

1. Field of the Invention

The present invention relates to an imaging apparatus.

2. Description of the Related Art

In a video camera or digital camera that has a zoom lens system, the focal length is changed to the telephoto side or wide-angle side, while the focus position is kept constant, by moving the zoom lens so as to change the zoom ratio, thereby changing the object distance. As a technique for complementing for an optical zoom, an electronic changing-magnification system (electronic zoom) is widely used. Using an electronic zoom can obtain the great advantage of achieving a reduction in size as compared with an imaging apparatus designed to realize wide-range magnification conversion using an optical system alone, although causing a considerable deterioration in image quality relative to an optical zoom.

Jpn. Pat. Appln. KOKAI Publication No. 6-339083 discloses a technique of matching the magnification of a bifocal optical system to that of an optical finder by changing-magnification processing using an electronic zoom. Jpn. Pat. Appln. KOKAI Publication No. 2003-283910 discloses a technique of sharing a driving control system between an optical finder and the imaging lens of a step zoom and selecting a step zoom with a magnification that does not exceed the magnification of the optical finder and is nearest to it so as to almost match the field angle of the optical finder to that of the imaging system, thereby adjusting the field angle using an electronic zoom. Jpn. Pat. Appln. KOKAI Publication No. 2001-136436 discloses a technique of performing changing-magnification processing by using an optical/electronic changing-magnification technique for canceling a variation in field angle with a change in imaging mode (for still images/moving images).

As a technique unique to an electronic zoom function, enlargement interpolation processing is mainstream, which changes the focal length to the telephoto side without moving the zoom lens by converting an obtained image with a pixel count smaller than that of the output of an electronic imaging device into a video signal corresponding to the pixel count of the output. A video camera having such an electronic zoom function cannot obtain an image with a size larger than the light-receiving screen size of the electronic imaging device, and hence cannot be zoomed to the wide-angle side, although can be zoomed to the telephoto side. In contrast to this, there have been provided apparatuses and methods that generate images substantially on the wide-angle side by using the difference between the pixel count of an electronic imaging device and the pixel count of an output image while the lens is fixed.

As an imaging apparatus that can perform such electronic zooming, for example, Jpn. Pat. Appln. KOKAI Publication No. 2000-295530 discloses a solid-state imaging apparatus that has a two-dimensional array of photoelectric conversion pixels and randomly accesses the photoelectric conversion pixels. This solid-state imaging apparatus comprises a first skip means for reading out arbitrarily designated pixels and a second skip means for reading out an image area smaller than the image area read out by the first skip means, and matches the number of pixels read out by the first skip means to that by the second skip means.

In addition, Jpn. Pat. Appln. KOKAI Publication No. 10-42183 discloses an imaging apparatus that comprises a first adjusting means for optically changing the field angle of an image, a second adjusting means for electronically changing the field angle of an image, and a control means for determining a field angle by controlling the first and second adjusting means, wherein the control means causes the second adjusting means to adjust the field angle to a field angle desired by a user, and substantially shifts the control of the field angle from the second adjusting means to the first adjusting means while holding the field angle. More specifically, this imaging apparatus uses a CCD type electronic imaging device. When electronic zooming is performed, the apparatus reads out all pixels from the CCD type electronic imaging device and temporarily stores them in a frame memory or the like. The apparatus then performs electrical interpolation processing on the basis of a pixel signal associated with the small number of pixels included in a partial area of the entire field angle, thereby generating an output image with a desired field angle.

Furthermore, Jpn. Pat. Appln. KOKAI Publication No. 2002-314868 discloses an imaging apparatus that controls an electronic zoom means for performing electronic zooming that changes an imaging position and a cutout field angle as a cutout range of imaging field angles in combination with an optical zoom by using an electronic imaging device that can designate a readout position and range on the electronic imaging device by performing thinning-out read operation of a photoelectric conversion signal on the electronic imaging device with the same clock-count as that for readout operation by the X-Y address scheme, thereby making the zoom range of an output field angle associated with an image signal to be finally output wider than either of an optical zoom range that can be obtained by only changing the imaging field angle and an electronic zoom range that can be obtained by changing only the cutout field angle.

BRIEF SUMMARY OF THE INVENTION

The present invention is directed to an imaging apparatus having a changing-magnification function based on a combination of an electronic zoom and an optical zoom. An imaging apparatus of the present invention has an optical zoom means that optically converts the magnification of an image and an electronic zoom means that changes the size of an image by electrical signal processing. The electronic zoom means at least operates when the optical zoom means is not set at the telephoto end. A total magnification is determined by changing magnification by the optical zoom means and changing magnification by the electronic zoom means. A pixel count $s1$ of the electronic imaging device, a pixel count $s2$ of a rectangle including the pixels on the electronic imaging device that are used by the electronic zoom means, and a pixel count $s3$ of an output satisfy $s1 \geq s2 > s3$ or $s1 > s2 \geq s3$.

Advantages of the invention will be set forth in the description which follows, and in part will be obvious from the description, or may be learned by practice of the invention.

Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 is a block diagram showing a more specific arrangement of the imaging apparatus according to this embodiment of the present invention;

FIG. 9 is a view showing a readout range of a frame with the readout start position in the readout range coinciding with the upper left pixel of the pixel array of a photoelectric conversion element in readout operation by repetitive ⅝ thinning-out readout operation;

FIG. 10 is a view showing a readout range of a frame with the readout start position in the readout range coinciding with the lower right pixel of the pixel array of the photoelectric conversion element in readout operation by repetitive ⅝ thinning-out readout operation;

FIG. 11 is a view showing the arrangement of the first embodiment of a changing-magnification optical system included in the image forming optical system of the imaging apparatus according to the embodiment of the present invention;

FIG. 14 is a view showing spherical aberration, astigmatism, chromatic difference of magnification, and distortion in the standard state of the changing-magnification optical system (VGA image formation) in FIG. 11;

FIG. 15 is a view showing spherical aberration, astigmatism, chromatic difference of magnification, and distortion in the state of the changing-magnification optical system at the telephoto end (VGA image formation) in FIG. 11;

FIG. 17 is a view showing spherical aberration, astigmatism, chromatic difference of magnification, and distortion in the state of the changing-magnification optical system at the wide-angle end (1.3M image formation) in FIG. 16;

FIG. 19 is a view showing spherical aberration, astigmatism, chromatic difference of magnification, and distortion in the standard state of the changing-magnification optical system (VGA image formation) in FIG. 16;

FIG. 20 is a view showing spherical aberration, astigmatism, chromatic difference of magnification, and distortion in the state of the changing-magnification optical system at the telephoto end (VGA image formation) in FIG. 16.

DETAILED DESCRIPTION OF THE INVENTION

The embodiments of the present invention will be described below with reference to the views of the accompanying drawing.

Figure 1A:
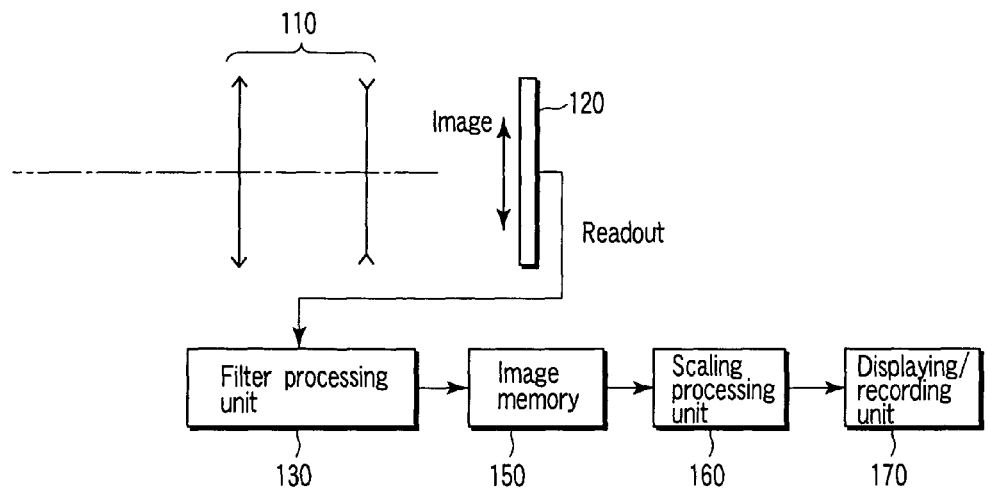
FIGS. 1A and 1B are block diagrams schematically showing the arrangement of an imaging apparatus according to an embodiment of the present invention.
Figure 1B:
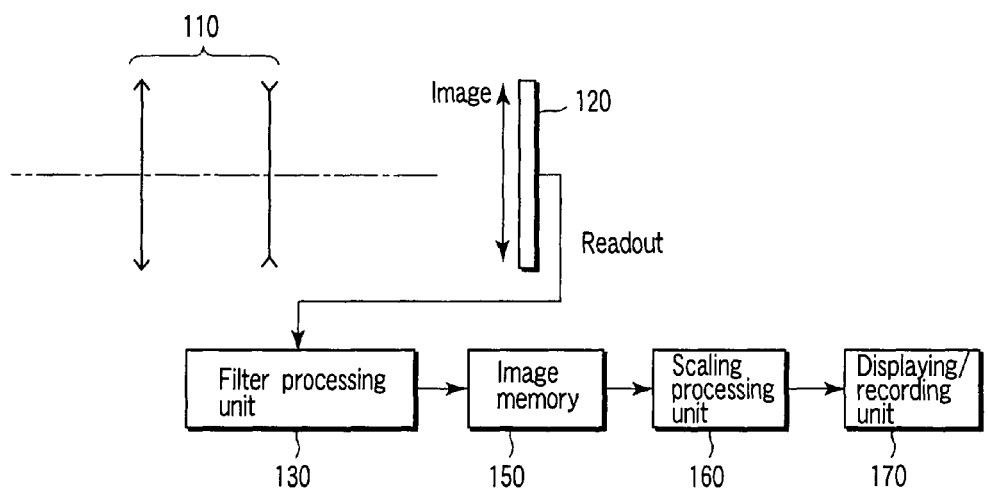

FIGS. 1A and 1B schematically show the arrangement of an imaging apparatus according to an embodiment of the present invention.

The imaging apparatus includes an image forming optical system 110 having the function of an optical zoom that forms an optical image of an object, an electronic imaging device 120 that outputs an electrical image signal by photoelectrically converting the optical image, a filter processing unit 130 that performs filter processing for the image signal output from the electronic imaging device 120 at the time of thinning-out readout operation, an image memory 150 that stores the image signal processed by the filter processing unit 130 as image data, a changing-magnification processing unit 160 that performs magnification conversion processing for the image data stored in the image memory 150 by a technique such as linear interpolation, and a displaying/recording unit 170 that displays and records the image.

In this imaging apparatus, the image forming magnification on the electronic imaging device 120 is changed by the image forming optical system 110. The image signal photoelectrically converted by the electronic imaging device 120 is subjected to filter processing by the filter processing unit 130 as in a case wherein thinning-out readout operation is performed. The processed image signal is stored as image data in the image memory 150. The image data stored in the image memory 150 is subjected to magnification conversion processing by the changing-magnification processing unit 160. The resultant data is transferred to the displaying/recording unit 170.

Figure 2A:
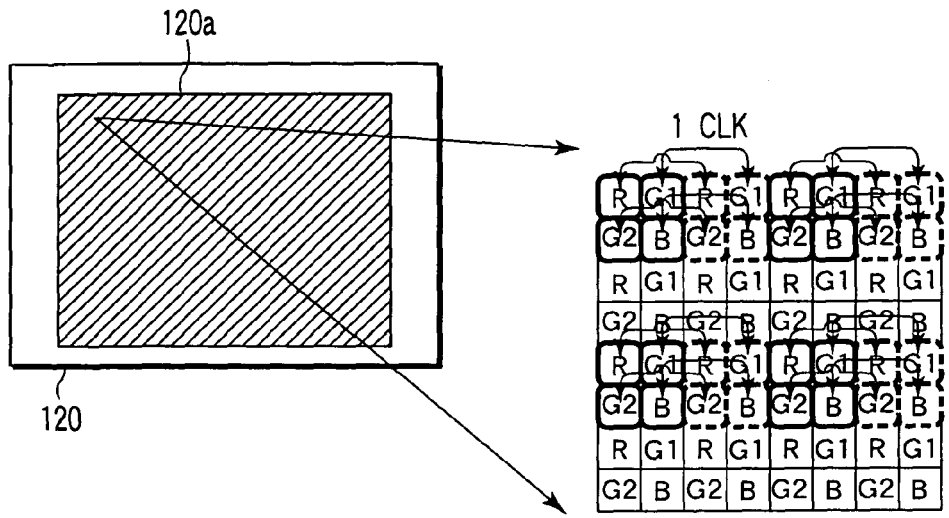
FIGS. 2A, 2B, and 2C are views showing various readout schemes for pixels on an electronic imaging device.
Figure 2B:
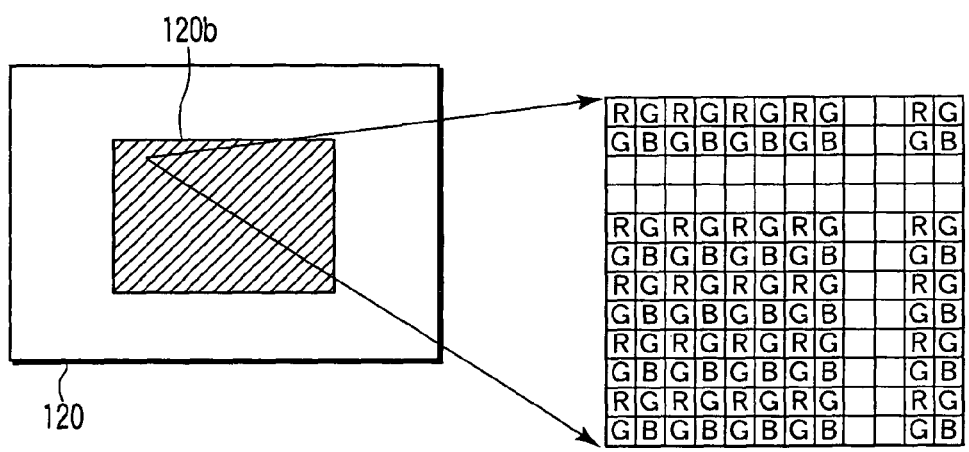
Figure 2C:
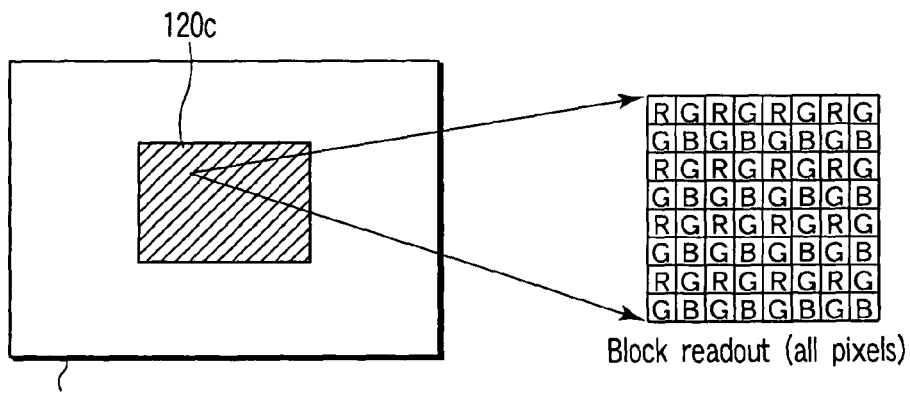

FIGS. 2A, 2B, and 2C show various readout schemes for pixels on the electronic imaging device. FIG. 2A shows pixel mixture readout operation of reading out a mixture of two pixel signals by one clock. In this case, a readout area is an area denoted by reference numeral 120*a*. FIG. 2B shows a readout scheme of reading out pixels by thinning-out readout operation. In this case, a readout area is an area denoted by reference numeral 120*b*, which is smaller than the area 120*a*. FIG. 2C shows a block readout scheme of reading out a predetermined area on the electronic imaging device 120 without performing pixel mixture readout operation or thinning-out readout operation. In this case, a readout area is an area denoted by reference numeral 120*c*, which is smaller than the area 120*b*. Referring to FIGS. 2A, 2B, and 2C, the total numbers of clocks for readout operation for the areas 120*a*, 120*b*, and 102*c* are the same. That is, the field angle of an image signal to be obtained is changed by changing the size of a readout area while performing readout operation with the same number of read clocks, thereby performing processing equivalent to changing-magnification processing.

Figure 3:
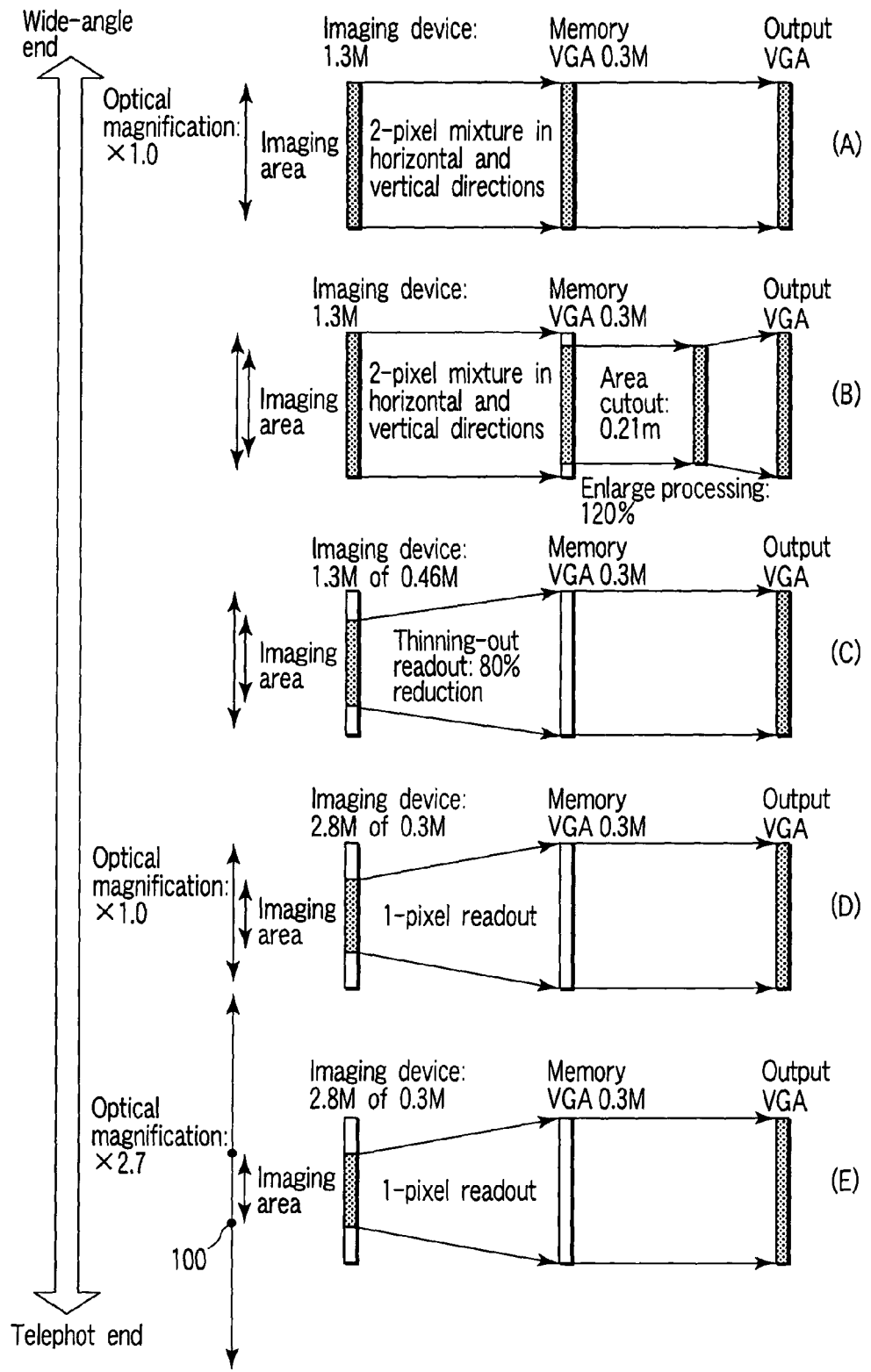
FIG. 3 is a view schematically showing changing magnification by the imaging apparatus according to this embodiment.

FIG. 3 schematically shows changing magnification by the imaging apparatus according to this embodiment. FIG. 3 shows the diameter of an image circle formed by the optical system, an area on the electronic imaging device, an area on the memory, and the size of an output signal. For example, the pixel count of the electronic imaging device is about 1.3M pixels (SXGA 1280×960 pixels), and an output pixel count is 0.3M pixels (VGA 640×480 pixels). At the wide-angle end (wide-angle end), an image circle is a circle containing the entire SXGA frame. Referring to FIG. 3, "(A)" indicates two-pixel mixture readout operation with the lens position being fixed at the wide-angle end; "(B)", two-pixel mixture readout operation+enlargement processing with the lens position being fixed at the wide-angle end; "(C)", thinning-out readout operation with the lens position being fixed at the wide-angle end; "(D)", readout operation for all pixels in VGA area+changing-magnification processing of obtaining output pixels as VGA pixels with the lens position being fixed at the wide-angle end; and "(E)", readout operation for all pixels in VGA area+changing-magnification processing of obtaining output pixels as VGA pixels with the optical magnification being increased to obtain an image with a higher magnification.

FIG. 3 exemplifies the changing-magnification method for moving imaging operation in which the number of pixels captured always conforms to VGA. In this case, a pixel count s1 of the electronic imaging device 120, a pixel count s2 of a rectangle containing the pixels on the electronic imaging device used for electronic zooming to be at least performed when the optical zoom is not set at the telephoto end, and a pixel count s3 of an output satisfy $$s1 \geq s2 > s3 \quad (1)$$

or $$s1 > s2 \geq s3 \quad (2)$$

In this embodiment, electronic zooming is performed to always hold s1>s3. In the case shown in FIG. 3, the equal sign of inequality (1) indicates that 1.3M pixels are read out, and 0.3M pixels are output, and the equal sign of inequality (2) indicates that 0.3M pixels of 1.3M pixels are read out in block, and 0.3M pixels are output.

In the form of the electronic zoom in FIG. 3 ((A): pixel addition, (B): pixel addition+enlargement processing, (C): thinning-out readout operation, and (D): all pixel readout operation), the optical system is arranged to set the optical magnification to ×1.0 at the wide-angle end. Suppose a focal length at the wide-angle end is $f_w$, and a focal length at the telephoto end with an optical magnification of ×2.7 is $f_t$, since electronic zoom processing is used at the wide-angle end, focal length f with use of electronic zoom=$f_w$. That is, $$\frac{f_w}{f_t} = \frac{f}{f_t}. \quad (3)$$

In addition, since the focal length f with the use of an electronic zoom may be set to any focal length between the wide-angle end and the telephoto end, $$\frac{f_w}{f_t} \leq \frac{f}{f_t} < 1. \quad (4)$$

Electronic changing-magnification (electronic zooming) includes enlargement processing and reduction processing. When reduction processing is to be performed, an area with a pixel count larger than that of an image to be output is captured on the electronic imaging device, and an output image is generated by changing-magnification processing such as interpolation processing. In this case, the total number of clocks for pixels to be captured differs, depending on an area to be imaged. That is, as the magnification shifts to the wide-angle side in changing-magnification processing, a larger number of clocks are required. In contrast to this, using simultaneous readout of pixels by thinning-out readout operation or pixel mixture readout operation allows only the size of a readout area to be changed without changing the number of clocks.

FIG. 4 shows the arrangement of the imaging apparatus according to this embodiment of the present invention in more detail.

An imaging apparatus 100 of this embodiment includes the image forming optical system 110 having the function of an optical zoom that forms an optical image of an object and the electronic imaging device 120 that continuously outputs image signals of a predetermined area of the optical image formed by the image forming optical system 110. That is, the image signal output from the electronic imaging device 120 is a moving image signal, which comprises the image data of time-serially consecutive frames.

The electronic imaging device 120 includes an area-like photoelectric conversion element 122 that acquires digital image data (a set of image data) by photoelectrically converting the optical image formed by the image forming optical system 110, and a readout control unit 124 that continuously reads out image data acquired by the photoelectric conversion element 122 while performing pixel thinning-out processing as needed.

The imaging apparatus 100 includes an area setting unit 132 that sets an area of an image to be output, an optical system control unit 137 that controls the optical system in accordance with the area of the image that is set by the area setting unit 132, a readout rule selecting unit 134 that selects a pixel thinning-out readout rule for the readout control unit 124, a readout phase control unit 136 that sets a readout start position in the image array of the photoelectric conversion element 122 for each imaging frame, and a distortion correcting unit 140 that corrects the distortion of the image data read out from the electronic imaging device 120.

On the basis of the pixel thinning-out readout rule selected by the readout rule selecting unit 134 and the pixel readout start position set by the readout phase control unit 136, the readout control unit 124 reads out pixel data in a corresponding range in the pixel array in the photoelectric conversion element 122. As a result, the thinned-out image data is output from the electronic imaging device 120.

The distortion correcting unit 140 includes a filter processing unit 142 that performs filter processing for the digital image data read out from the photoelectric conversion element 122 by the readout control unit 124, and a filter coefficient setting unit 144 that sets a filter coefficient used for filter processing in the filter processing unit 142 in accordance with the pixel thinning-out readout rule selected by the readout rule selecting unit 134.

The filter coefficient setting unit 144 includes an LUT storage unit 146 that stores a lookup table (LUT) containing filter coefficients and a filter coefficient selecting unit 148 that selects a filter coefficient from the lookup table stored in the LUT storage unit 146.

The imaging apparatus 100 further includes an image acquisition region selection processing unit 138 that selects a region common to all the frames of the image data corrected by the distortion correcting unit 140 on the basis of the readout range set by the readout control unit 124 for each frame. The readout rule selecting unit 134 selects a pixel thinning-out readout rule so as to make readout control unit 124 read out image data throughout a range wider than the area of the image set by the area setting unit 132 in accordance with changing of the reference position of the readout range for each frame by the readout phase control unit 136 and selection of a region common to all the frames by the image acquisition region selection processing unit 138.

On the basis of the readout rule selected by the readout rule selecting unit 134 and the reference position of the readout range set by the readout phase control unit 136, the readout control unit 124 in the electronic imaging device 120 continuously reads out image data (pixel data corresponding to one frame) in a corresponding range in the pixel array in the photoelectric conversion element 122. As a result, the electronic imaging device 120 outputs a moving signal comprising the image data of time-serially consecutive frames.

The imaging apparatus 100 preferably includes three cyclic frame memories 152, 154, and 156 that temporarily store the image data of frames, and an inter-frame computation processing unit 158 that generates new image data by performing computation processing for the image data of frames stored in the frame memories 152, 154, and 156.

The imaging apparatus 100 further includes an image signal processing unit 162 that performs predetermined processing (e.g., full color processing, white balance adjustment, grayscale transformation, and edge enhancement) for the distortion-corrected image signal output from the distortion correcting unit 140, and an image display unit 174 that displays an image in accordance with the image signal output from the image signal processing unit 162. In addition, the imaging apparatus 100 includes an image recording unit 176 that records an image in accordance with the image signal output from the image signal processing unit 162.

The imaging apparatus 100 displays, on the image display unit 174, the image data acquired by the photoelectric conversion element 122 without any change when no area is set by the area setting unit 132. That is, all the pixel data of the image data are displayed. The image display unit 174 therefore displays an image similar to the optical image formed by the image forming optical system 110.

The area setting unit 132 comprises, for example, a graphical user interface (GUI) corresponding to a window on the image display unit 174. The user can therefore designate a range that he/she desires to display by operating a button, mouse, or the like on an image displayed on the screen of the image display unit 174.

The electronic imaging device 120 can perform thinning-out readout operation. With this thinning-out readout operation, the electronic imaging device 120 can read out the pixels in the specific area on the photoelectric conversion element 122 in a period of time shorter than that required when all the pixels are read out.

If, for example, the photoelectric conversion element 122 is an electronic imaging device using a CMOS, the electronic imaging device 120 can designate a readout position by using shift registers in both the horizontal and vertical directions.

If the photoelectric conversion element 122 is a CCD, since the CCD is read out while electric charge is shifted in the horizontal direction, the electronic imaging device 120 can read out all the pixels in the horizontal direction and can read out pixels upon thinning-out operation in the vertical direction.

The distortion correcting unit 140 can interpolate omitted information with respect to the digital image data thinned out and read out in this manner, and performs filter processing for magnification conversion.

Figure 5:
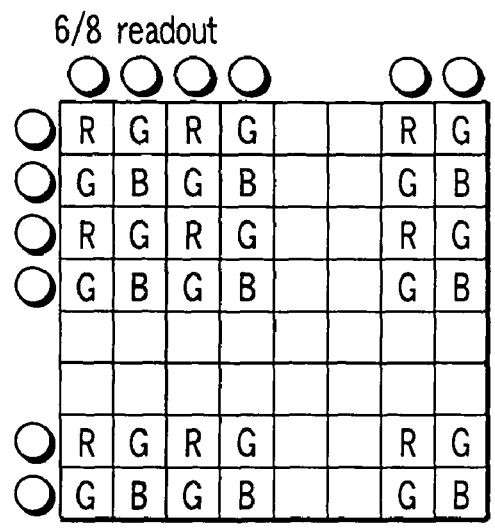
FIG. 5 is a view showing an example of readout operation upon thinning-out two pixels of eight pixels in both the horizontal and vertical directions.
Figure 6:
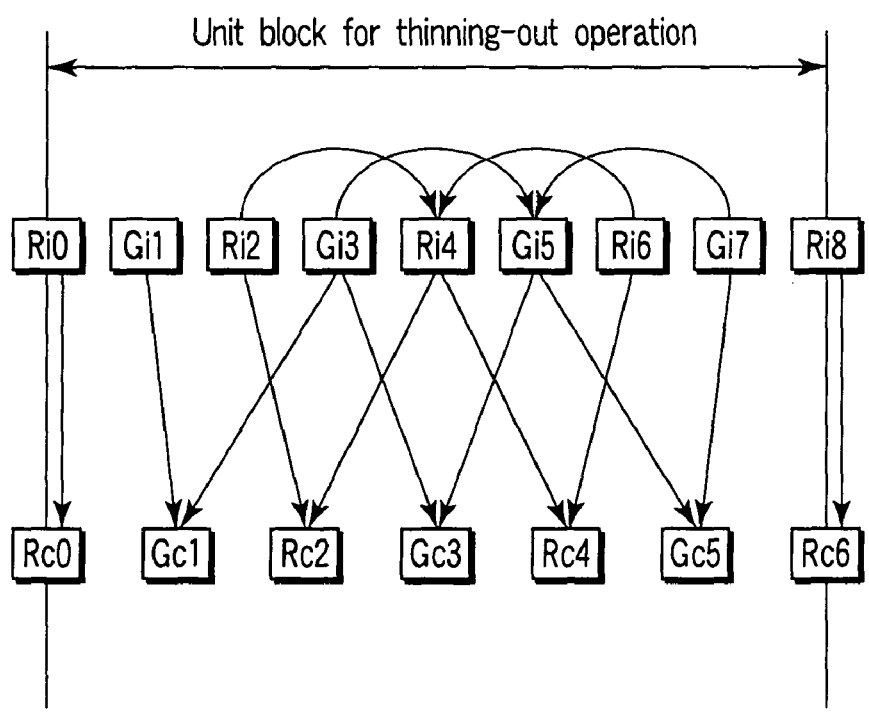
FIG. 6 is a view schematically showing the operation of linearly interpolating skipped pixels with neighboring pixels, in readout operation performed while two pixels are thinned out from eight pixels shown in FIG. 5, so as to fill the skipped portions to form eight-pixel data, and forming the resultant data into six-pixel data by linear interpolation.
Figure 7:
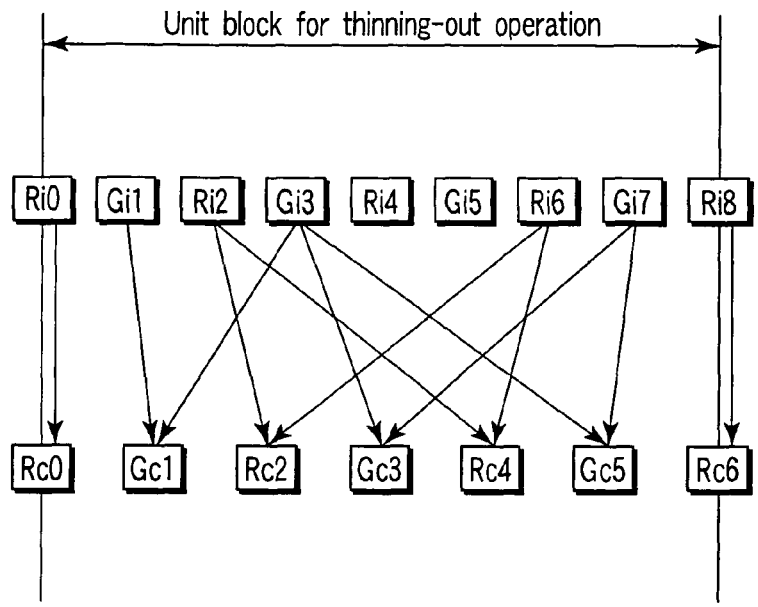
FIG. 7 is a view schematically showing processing of converting data obtained by sampling at uneven pixel intervals into data obtained at sampling at even pixel intervals in readout operation performed while two pixels are thinned out from eight pixels in FIG. 5.

Distortion correction processing for thinning-out read operation will be described in detail below. FIG. 5 shows an example of readout operation with two pixels being thinned out from eight pixels in both the horizontal and vertical directions. If readout operation is performed in the manner shown in FIG. 5, omitted portions appear in the image. Consider, therefore, the operation of linearly interpolating the skipped pixels (R4 and G5) with neighboring pixels of the same colors (R2 and R4, and G3 and G7), respectively, so as to fill the omitted portions, and forming the resultant data into six-pixel data by linear interpolation, as shown in FIG. 6. That is, as shown in FIG. 7, processing is performed to convert data obtained by sampling at uneven pixel intervals into data obtained at sampling at even pixel intervals. Consider here one-line readout operation with thinning out. With reference to the upper left position in FIG. 5, the positions of readout pixels are given by $Ri_0$, $Gi_1$, $Ri_2$, $Gi_3$, $Ri_6$, and $Gi_7$, and the subsequent pixel positions are repeated according to the same rule. A matrix representation of distortion correction (conversion) in this case is given by $$\begin{pmatrix} Rc_0 \\ Gc_1 \\ Rc_2 \\ Gc_3 \\ Rc_4 \\ Gc_5 \end{pmatrix} = \begin{pmatrix} 1 & 0 & 0 & 0 & 0 & 0 \\ 0 & \frac{5}{6} & 0 & \frac{1}{6} & 0 & 0 \\ 0 & 0 & \frac{5}{6} & 0 & \frac{1}{6} & 0 \\ 0 & 0 & 0 & \frac{3}{4} & 0 & \frac{1}{4} \\ 0 & 0 & \frac{1}{6} & 0 & \frac{5}{6} & 0 \\ 0 & 0 & 0 & \frac{1}{12} & 0 & \frac{11}{12} \end{pmatrix} \begin{pmatrix} Ri_0 \\ Gi_1 \\ Ri_2 \\ Gi_3 \\ Ri_6 \\ Gi_7 \end{pmatrix}. \quad (5)$$

Figure 8:
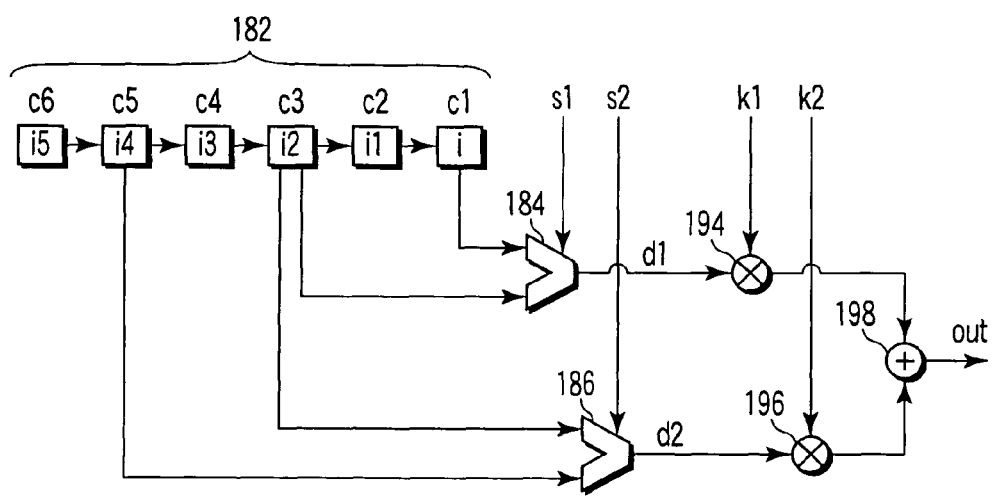
FIG. 8 is a view showing an arrangement that performs distortion correction in FIG. 7 by pipeline processing.

Pipeline processing for distortion correction is performed by the arrangement shown in FIG. 8. A shift register 182 shifts held image data one by one to the right for each operation based on a clock. A selector 184 selects either the first data or the third data of five adjacent pixel data held in the shift register 182 in accordance with the state of s1. A selector 186 selects either the third data or the fifth data of five adjacent pixel data held in the shift register 182 in accordance with the state of s2.

A multiplier 194 multiplies an output d1 from the selector 184 by a coefficient k1 for weighted addition. A multiplier 196 multiplies an output d2 from the selector 186 by a coefficient k2 for weighted addition. An adder 198 adds the output from the multiplier 194 to the output from the multiplier 196.

Table 1 shows the operation (state transition) of pipeline processing by the filter processing unit shown in FIG. 8.

TABLE 1

| c1 | c2 | c3 | c4 | c5 | c6 | s1 | s2 | d1 | d2 | k1 | k2 | out |
|---|---|---|---|---|---|---|---|---|---|---|---|---|
| i0 | i1 | i2 | i3 | i4 | i5 | 0 | 0 | i2 | i4 | 1 | 0 | $1 \times i2 + 0 \times i4$ |
| i1 | i2 | i3 | i4 | i5 | i6 | 0 | 0 | i3 | i5 | 5/6 | 1/6 | $5/6 \times i3 + 1/6 \times i5$ |
| i2 | i3 | i4 | i5 | i6 | i7 | 0 | 0 | i4 | i6 | 5/6 | 1/6 | $5/6 \times i4 + 1/6 \times i6$ |
| i3 | i4 | i5 | i6 | i7 | i8 | 0 | 0 | i5 | i7 | 3/4 | 1/4 | $3/4 \times i5 + 1/4 \times i7$ |
| i4 | i5 | i6 | i7 | i8 | i9 | 1 | 1 | i4 | i6 | 1/6 | 5/6 | $1/6 \times i4 + 5/6 \times i6$ |
| i5 | i6 | i7 | i8 | i9 | i10 | 1 | 1 | i5 | i7 | 1/12 | 11/12 | $1/12 \times i5 + 11/12 \times i7$ |
| i6 | i7 | i8 | i9 | i10 | i11 | 0 | 0 | i8 | i10 | 1 | 0 | $1 \times i8 + 0 \times i10$ |
| i7 | i8 | i9 | i10 | i11 | i12 | 0 | 0 | i9 | i11 | 5/6 | 1/6 | $5/6 \times i9 + 1/6 \times i11$ |
| i8 | i9 | i10 | i11 | i12 | i13 | 0 | 0 | i10 | i12 | 5/6 | 1/6 | $5/6 \times i10 + 1/6 \times i12$ |
| i9 | i10 | i11 | i12 | i13 | i14 | 0 | 0 | i11 | i13 | 3/4 | 1/4 | $3/4 \times i11 + 1/4 \times i13$ |
| i10 | i11 | i12 | i13 | i14 | i15 | 1 | 1 | i10 | i12 | 1/6 | 5/6 | $1/6 \times i10 + 5/6 \times i12$ |
| i11 | i12 | i13 | i14 | i15 | i16 | 1 | 1 | i11 | i13 | 1/12 | 11/12 | $1/12 \times i11 + 11/12 \times i13$ |
| i12 | i13 | i14 | i15 | i16 | i17 | 0 | 0 | i14 | i16 | 1 | 0 | $1 \times i14 + 0 \times i16$ |
| i13 | i14 | i15 | i16 | i17 | i18 | 0 | 0 | i15 | i17 | 5/6 | 1/6 | $5/6 \times i15 + 1/6 \times i17$ |
| i14 | i15 | i16 | i17 | i18 | i19 | 0 | 0 | i16 | i18 | 5/6 | 1/6 | $5/6 \times i16 + 1/6 \times i18$ |
| i15 | i16 | i17 | i18 | i19 | i20 | 0 | 0 | i17 | i19 | 3/4 | 1/4 | $3/4 \times i17 + 1/4 \times i19$ |
| i16 | i17 | i18 | i19 | i20 | i21 | 1 | 1 | i16 | i18 | 1/6 | 5/6 | $1/6 \times i16 + 5/6 \times i18$ |
| i17 | i18 | i19 | i20 | i21 | i22 | 1 | 1 | i17 | i19 | 1/12 | 11/12 | $1/12 \times i17 + 11/12 \times i19$ |
| i18 | i19 | i20 | i21 | i22 | i23 | 0 | 0 | i20 | i22 | 1 | 0 | $1 \times i20 + 0 \times i22$ |
| i19 | i20 | i21 | i22 | i23 | i24 | 0 | 0 | i21 | i23 | 5/6 | 1/6 | $5/6 \times i21 + 1/6 \times i23$ |
| i20 | i21 | i22 | i23 | i24 | i25 | 0 | 0 | i22 | i24 | 5/6 | 1/6 | $5/6 \times i22 + 1/6 \times i24$ |

A pixel data row (i0, i1, i2, . . . ) supplied to the shift register 182 is shifted to the right for each operation based on a clock with c1=i0, c2=i1, c3=i2, . . . being an initial state. Along with this operation, the selector 184 selects c1 when s1 is 1 (i.e., d1=c1), and selects c3 when s1 is 0 (i.e., d1=c3). The selector 186 selects c3 when s2 is 1 (i.e., d2=c3), and selects c5 when s2 is 0 (i.e., d2=c5). The coefficients k1 and k2 are respectively supplied from the memory in the filter coefficient setting unit 144 to the multipliers 194 and 196 in synchronism with clocks. The adder 198 outputs out=k1×d1+k2×d2.

As is obvious from Table 1, pipeline processing including pixel operation (selector switching) is performed by shifting sequential data, switching the selectors in accordance with the states of s1 and s2, outputting the coefficients k1 and k2 for weighted addition in accordance with the thinning-out rule indicated by equation (5), and performing a weighted addition computation in synchronism with each other.

The imaging apparatus 100 of this embodiment interpolates pixel data omitted between two consecutive frames such that interlace operation is performed to interpolate omitted pixel data between two fields.

For this reason, the readout phase control unit 136 changes the reference position of the range of pixel data (readout range) read out by the readout control unit 124 from the photoelectric conversion element 122 upon pixel thinning-out operation for each frame. More specifically, the readout phase control unit 136 changes the reference position of a readout range for each frame periodically in accordance with a predetermined rule.

For example, the readout phase control unit 136 shifts the reference position of the range of pixel data read out by the readout control unit 124 such that the image data of consecutive frames have a few omitted pixel data as a whole. The shift amount is preferably set to about four to eight pixels.

As a result, pixel data at a specific position in the photoelectric conversion element 122 that is omitted from the image data of a specific frame due to thinning-out readout operation is contained in the image data of another frame. That is, this always prevents pixel data at a specific position in the photoelectric conversion element 122 from being omitted from an image signal output from the electronic imaging device 120.

In addition, the inter-frame computation processing unit 158 performs processing of interpolating omitted pixel data with respect to the image data of consecutive frames stored in the frame memories 152, 154, and 156. For example, addition of 1/2: 1/2 is performed with respect to the image data of two consecutive frames. Alternatively, addition of 1/4: 1/2: 1/4 is performed with respect to the image data of three consecutive image data.

FIGS. 9 and 10 schematically show how the reference position of a readout range is shifted in readout operation by repetitive 6/8 thinning-out readout operation. Referring to FIGS. 9 and 10, [x, y] represents a pixel position in the pixel array of the photoelectric conversion element 122, and (x, y) represents a pixel data array after readout.

As shown in FIGS. 9 and 10, the pixel count of the photoelectric conversion element 122 is given by k pixels in the horizontal direction and l pixels in the vertical direction. Therefore, the position of the upper left pixel in the photoelectric conversion element 122 is represented by [0, 0], and the position of the lower right pixel is represented by [k, l]. In addition, the pixel count of the readout range of one frame is given by m pixels in the horizontal direction and n pixels in the vertical direction. Therefore, the upper left readout start position in the frame is represented by (0, 0), and the lower right readout end position is represented by (m, n). The readout range of the frame in FIG. 10 is shifted from the readout range of the frame in FIG. 9 by +2 pixels in the horizontal direction and +2 pixels in the vertical direction.

In the frame in FIG. 9, the upper left readout start position (0, 0) coincides with the upper left pixel position [0, 0] in the photoelectric conversion element 122. That is, $$(0, 0) = [0, 0]. \quad (6)$$

In addition, a readout end position (m, n) is given by $$(m, n) = [k-2, l-2]. \quad (7)$$

In the frame shown in FIG. 10, the upper left readout start position is given by $$(0, 0)=[2, 2]. \tag{8}$$

In addition, the readout end position is given by $$(m, n)=[k, l]. \tag{9}$$

The image acquisition region selection processing unit 138 selects a region common to the frames shown in FIGS. 9 and 10. That is, the image acquisition region selection processing unit 138 selects a rectangular range whose diagonal vertices are given by (2, 2) and (m, n) with respect to the frame in FIG. 9, and selects a rectangular range whose diagonal vertices are given by (0, 0) and (m−2, n−2) with respect to the frame in FIG. 10. The range selected by the image acquisition region selection processing unit 138 always has (m−2)×(n−2) pixel data.

Considering an area to be cropped in advance, the total number of images to be read out from the photoelectric conversion element 122 must be set in consideration of the image size of an output and a phase shift. The image acquisition region selection processing unit 138 changes the range to be cropped on the basis of the information of a readout start position.

The frame memories 152, 154, and 156 are FIFO (First In First Out) memories, and the inter-frame computation processing unit 158 generates an output image by using pixels at corresponding positions in the frame memories 152, 154, and 156.

For example, a composite image out (i, j) of two frames is represented by $$\text{out}(i, j)=0.5I(k, i, j)+0.5I(k-1, i, j), \tag{10}$$

where (i, j) represent a pixel position, and I(k, i, j) is the intensity of an image signal at the pixel position (i, j) of the kth frame.

A composite image out(i, j) of three frames is represented by using weight distribution as follows:

$$\text{out}(i, j) = 0.25I(k, i, j) + 0.5I(k-1, i, j) + 0.25I(k-2, i, j) \tag{11}$$

The image acquisition region selection processing unit 138 corrects the positional shift between images of frames with respect to the image data that are read out by different readout rules between the frames and subjected to filter processing for distortion correction. Image data corresponding to a predetermined number of frames are stored in the frame memories 152, 154, and 156. The inter-frame computation processing unit 158 then performs inter-frame computation for the image data. The resultant image data are then output to the image display unit 174 and image recording unit 176 through the image signal processing unit 162. Performing inter-frame interpolation provides the effect of improving image quality by a low-pass filter in addition to the distortion correction effect.

Using such electronic changing magnification and pixel mixture readout operation forms an image by reading out pixels on the electronic imaging device 120 with a predetermined number of clocks regardless of the size of a readout range.

An embodiment of a changing-magnification optical system that changes the image magnification to the states of (A), (D), and (E) in FIG. 3 will be described next. The specific arrangement of an optical zoom means of the image forming optical system 110 will be described.

First Embodiment of Changing-Magnification Optical System

FIG. 11 is a view showing the arrangement of the first embodiment of the changing-magnification optical system included in the image forming optical system of the imaging apparatus of the embodiment of the present invention. FIG. 11 shows the changing-magnification optical system in a state at the wide-angle end, in a standard state, and in a state at the telephone end. As shown in FIG. 11, the changing-magnification optical system according to this embodiment comprises a first lens group G1, a second lens group G2, and a third lens group G3, which are sequentially arranged from the object side. The second lens group G2 includes an aperture stop S. Referring to FIG. 11, reference symbol F denotes a parallel plate group such as an infrared cut filter, a low-pass filter, the cover glass of an electronic imaging device, and the like, and I an image forming plane.

The first lens group G1 comprises a negative lens and has negative refracting power. The second lens group G2 comprises a positive lens and negative lens and has positive refracting power. The third lens group G3 comprises a positive meniscus lens with its concave surface facing the object side and has positive refracting power.

Figure 12:
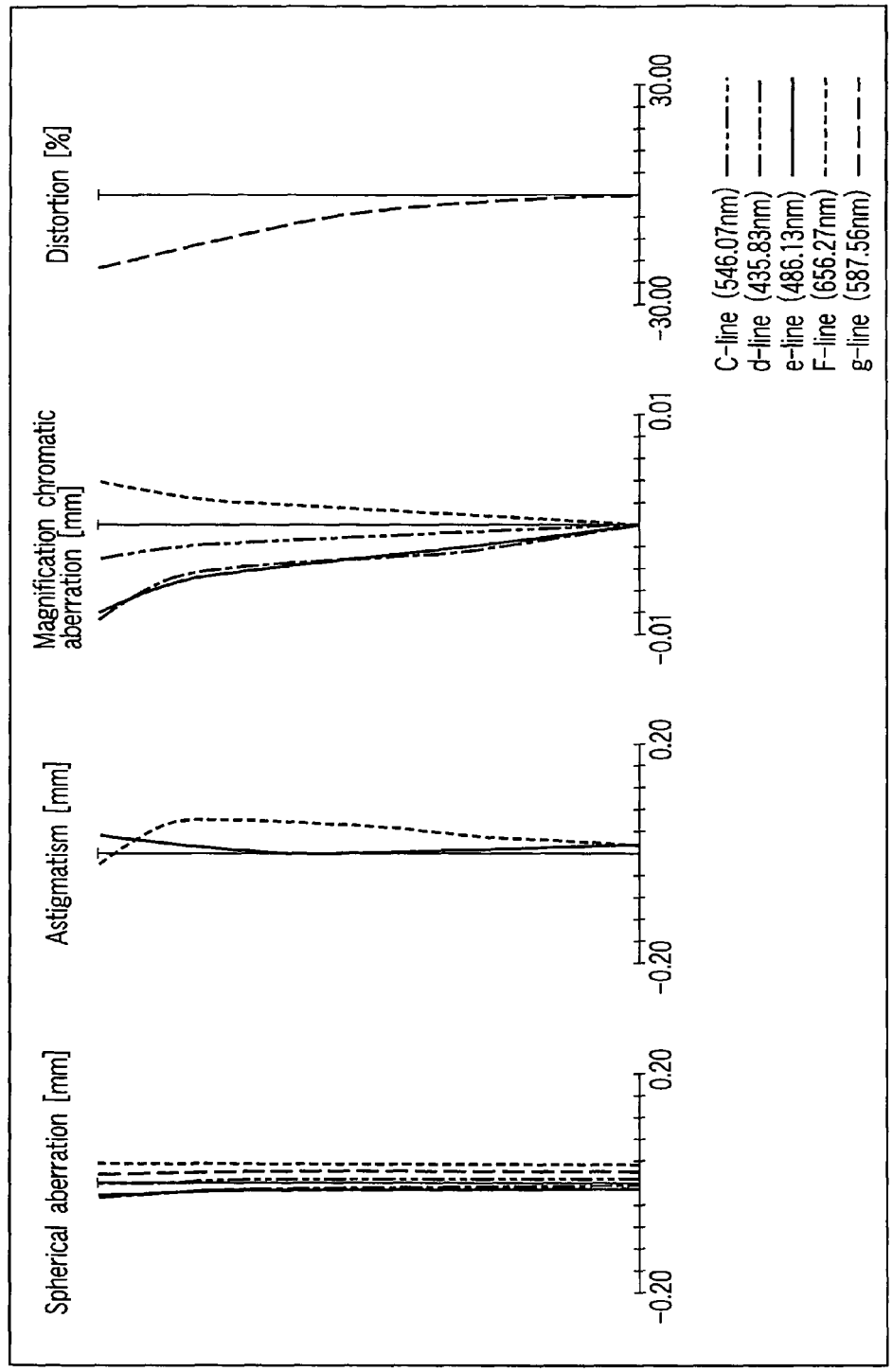
FIG. 12 is a view showing spherical aberration, astigmatism, chromatic difference of magnification, and distortion in the state of the changing-magnification optical system at the wide-angle end (1.3M image formation) in FIG. 11.
Figure 13:
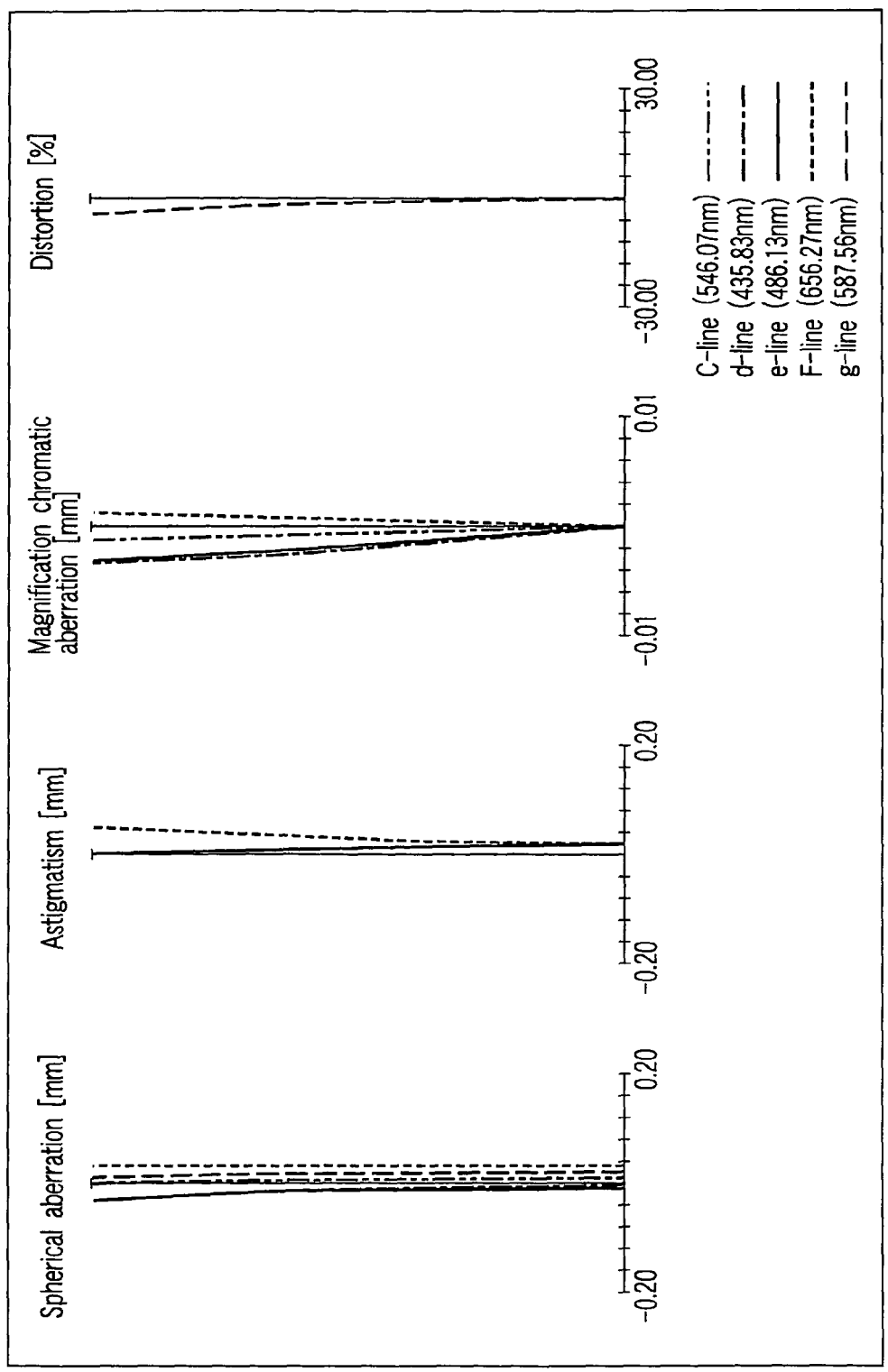
FIG. 13 is a view showing spherical aberration, astigmatism, chromatic difference of magnification, and distortion in the state of the changing-magnification optical system at the wide-angle end (VGA image formation) in FIG. 11.

FIG. 12 shows spherical aberration, astigmatism, chromatic difference of magnification, and distortion in the state of the changing-magnification optical system at the wide-angle end (1.3M image formation) in FIG. 11. FIG. 13 shows spherical aberration, astigmatism, chromatic difference of magnification, and distortion in the state of the changing-magnification optical system at the wide-angle end (VGA image formation) in FIG. 11. FIG. 14 shows spherical aberration, astigmatism, chromatic difference of magnification, and distortion in the standard state of the changing-magnification optical system (VGA image formation) in FIG. 11. FIG. 15 shows spherical aberration, astigmatism, chromatic difference of magnification, and distortion in the state of the changing-magnification optical system at the telephoto end (VGA image formation) in FIG. 11. In this case, the enlargement ratio in the aberration diagram of FIG. 12 at the wide-angle end (1.3M image formation) is different from that in the aberration diagram of FIG. 13 at the wide-angle end (VGA image formation) at the same lens position (the enlargement ratio in the vertical direction in FIG. 3 is twice that in FIG. 12). In the aberration diagram at the wide-angle end, the distortion is large in the negative direction, which can be corrected by geometrical conversion. For example, the distance from the optical center position on an acquired image is represented by r, and a pixel position may be corrected by using functions of r and $r^2$.

All the lenses of the changing-magnification optical system in FIG. 11 are manufactured by using a resin material. The following are the numerical data of optical members constituting the changing-magnification optical system in FIG. 11. Of the numerical data, r1, r2, . . . represent the curvature radii of the respective lens surfaces, d1, d2, . . . represent the thicknesses or air spacings of the respective lenses, nd1, nd2, . . . represent refractive indexes of the respective lenses with respect to d-lines, and vd1, vd2, . . . represent the Abbe numbers of the respective lenses.

Letting Z be the distance between a point on an aspherical surface with a height y from an optical axis and a tangent plane at an aspherical surface vertex, R be the curvature of the aspherical surface vertex, K be a cone coefficient, and $A_4$, $A_6$, and $A_8$ be aspherical surface coefficients, an aspherical surface is represented by $$Z = \frac{\frac{y^2}{R}}{1 + \sqrt{1 - [1+K]\left(\frac{y}{R}\right)^2}} + A_4 y^4 + A_6 y^6 + A_8 y^8. \quad (12)$$

These symbols are common to the numerical data of a changing-magnification optical system according to the second embodiment.

Table 2 shows various data of the optical members of the changing-magnification optical system in FIG. 11.

TABLE 2

| Surface Number | r | d | nd | vd |
|---|---|---|---|---|
| 1 | aspherical surface | 0.50 | 1.52542 | 55.78 |
| 2 | aspherical surface | D2 | | |
| 3 | stop | −0.20 | | |
| 4 | aspherical surface | 1.07 | 1.52542 | 55.78 |
| 5 | aspherical surface | 0.50 | | |
| 6 | −9.715 | 0.66 | 1.60687 | 27.03 |
| 7 | aspherical surface | D7 | | |
| 8 | −8.802 | 0.79 | 1.52542 | 55.78 |
| 9 | aspherical surface | 0.87 | | |
| 10 | ∞ | 0.50 | 1.51633 | 64.14 |
| 11 | ∞ | | | |

Table 3 shows the aspherical surface coefficients and the like of the optical members of the changing-magnification optical system in FIG. 11.

TABLE 3

| Surface Number | R | K | A4 | A6 | A8 |
|---|---|---|---|---|---|
| 1 | −9.017 | −52.324 | −2.64816 × 10⁻² | 5.61423 × 10⁻³ | −3.48634 × 10⁻⁴ |
| 2 | 5.919 | 4.493 | −2.18980 × 10⁻² | 3.04748 × 10⁻³ | 4.29679 × 10⁻⁴ |
| 4 | 1.837 | −1.054 | 1.03504 × 10⁻² | −3.33870 × 10⁻³ | 2.95505 × 10⁻³ |
| 5 | −2.775 | 1.176 | 5.10617 × 10⁻² | −1.48735 × 10⁻² | 8.33970 × 10⁻³ |
| 7 | 2.118 | 0.110 | −5.71051 × 10⁻³ | 2.81480 × 10⁻² | −1.29115 × 10⁻³ |
| 9 | −2.614 | −3.227 | −5.22279 × 10⁻³ | 4.69351 × 10⁻⁴ | −1.28188 × 10⁻³ |

Table 4 shows the zoom data of the changing-magnification optical system in FIG. 11.

TABLE 4

| | Wide-angle (1.3 M) | Wide-angle (VGA) | Standard | Telephoto |
|---|---|---|---|---|
| Focal Length | 3.126 | 3.126 | 4.988 | 8.640 |
| FNO. | 2.80 | 2.80 | 3.58 | 5.10 |
| D2 | 4.18 | 4.18 | 1.97 | 0.40 |
| D7 | 0.97 | 0.97 | 2.26 | 4.75 |

Second Embodiment of Changing-Magnification Optical System

Figure 16:
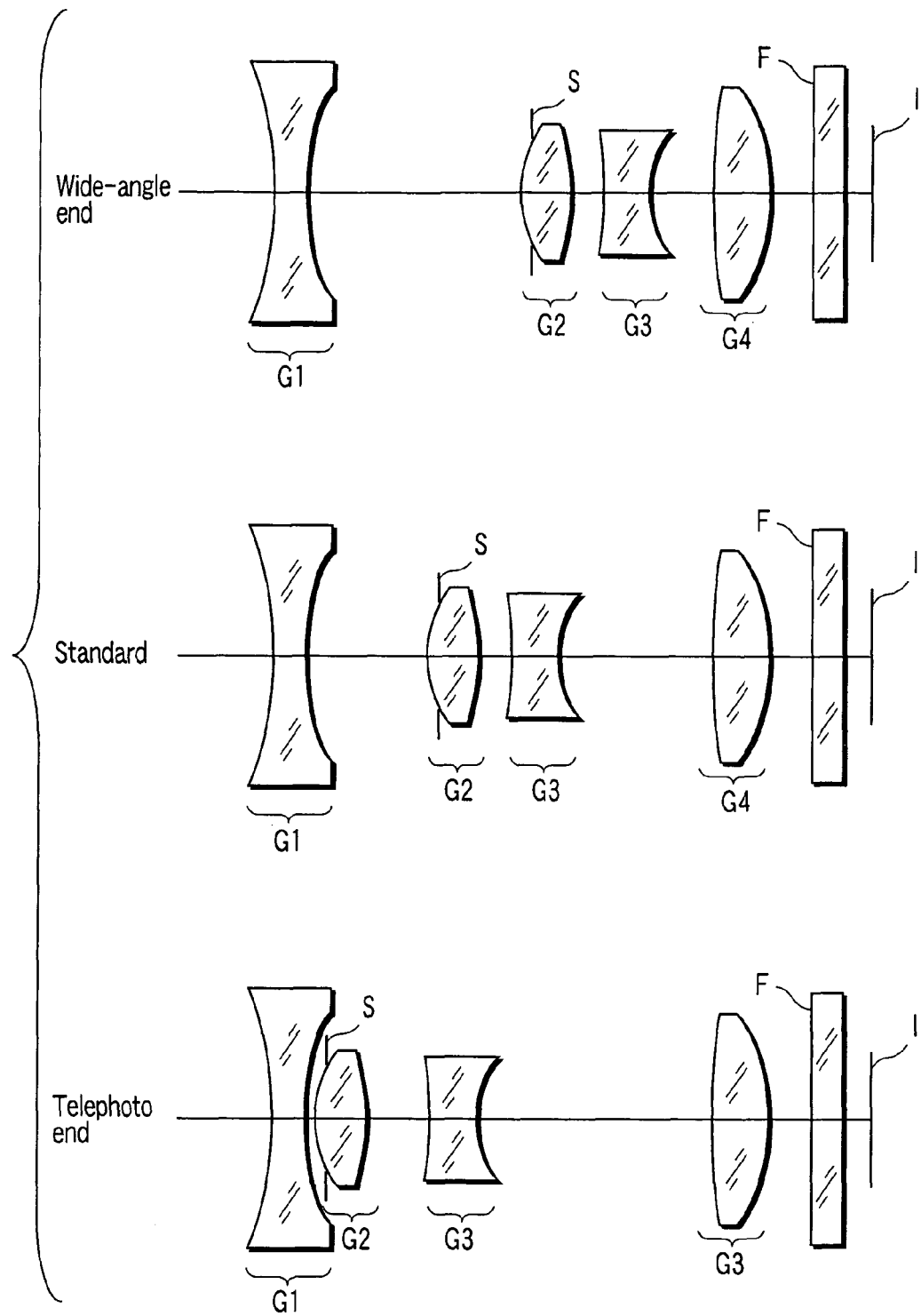
FIG. 16 is a view showing the arrangement of the second embodiment of a changing-magnification optical system included in the image forming optical system of the imaging apparatus according to the embodiment of the present invention.

FIG. 16 is a view showing the arrangement of the second embodiment of the changing-magnification optical system included in the image forming optical system of the imaging apparatus of the embodiment of the present invention. FIG. 16 shows the changing-magnification optical system in a state at the wide-angle end, in a standard state, and in a state at the telephone end. As shown in FIG. 16, the changing-magnification optical system according to this embodiment comprises a first lens group G1, a second lens group G2, a third lens group G3, and a fourth lens group G4, which are sequentially arranged from the object side. The second lens group G2 includes an aperture stop S. Referring to FIG. 16, reference symbol F denotes a parallel plate group such as an infrared cut filter, a low-pass filter, the cover glass of an electronic imaging device, and the like.

The first lens group G1 comprises a biconcave negative lens and has negative power. The second lens group G2 comprises a biconvex positive lens and has positive power. The third lens group G3 comprises a biconcave negative lens and has negative power. The fourth lens group G4 comprises a biconvex positive lens and has positive power.

Figure 18:
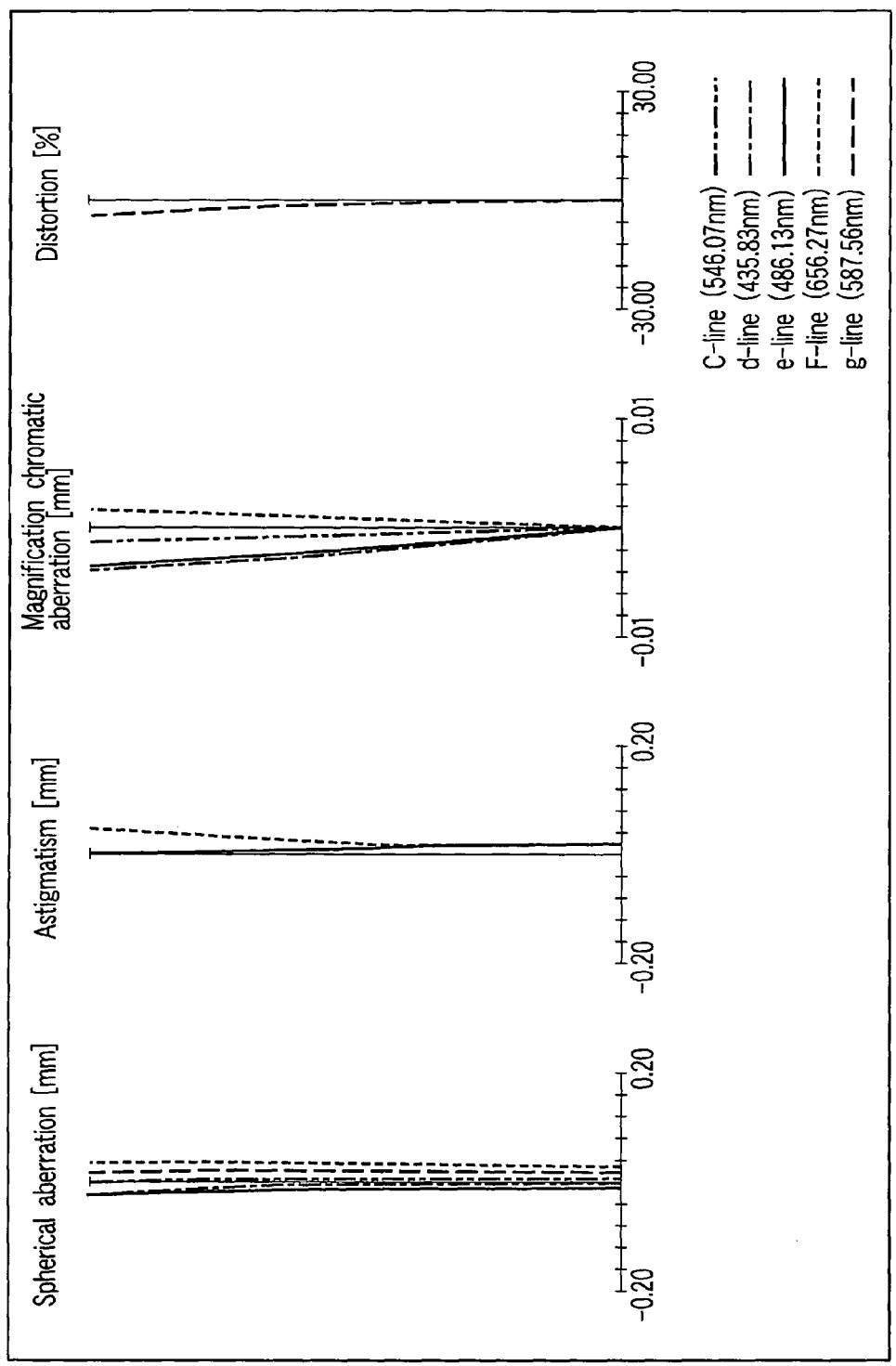
FIG. 18 is a view showing spherical aberration, astigmatism, chromatic difference of magnification, and distortion in the state of the changing-magnification optical system at the wide-angle end (VGA image formation) in FIG. 16.

FIG. 17 shows spherical aberration, astigmatism, chromatic difference of magnification, and distortion in the state of the changing-magnification optical system at the wide-angle end (1.3M image formation) in FIG. 16. FIG. 18 shows spherical aberration, astigmatism, chromatic difference of magnification, and distortion in the state of the changing-magnification optical system at the wide-angle end (VGA image formation) in FIG. 16. FIG. 19 shows spherical aberration, astigmatism, chromatic difference of magnification, and distortion in the standard state of the changing-magnification optical system (VGA image formation) in FIG. 16. FIG. 20 shows spherical aberration, astigmatism, chromatic difference of magnification, and distortion in the state of the changing-magnification optical system at the telephoto end (VGA image formation) in FIG. 16. In this case, the enlargement ratio in the aberration diagram of FIG. 17 at the wide-angle end (1.3M image formation) is different from that in the aberration diagram of FIG. 18 at the wide-angle end (VGA image formation) at the same lens position (the enlargement ratio in the vertical direction in FIG. 17 is twice that in FIG. 18).

All the lenses of the changing-magnification optical system in FIG. 16 are manufactured by using a resin material. The following are the numerical data of optical members constituting the changing-magnification optical system in FIG. 16.

Table 5 shows various data of the optical members of the changing-magnification optical system in FIG. 11.

TABLE 5

| Surface Number | r | d | nd | vd |
|---|---|---|---|---|
| 1 | aspherical surface | 0.67 | 1.52542 | 55.78 |
| 2 | aspherical surface | D2 | | |
| 3 | stop | −0.22 | | |
| 4 | aspherical surface | 0.98 | 1.52542 | 55.78 |
| 5 | aspherical surface | D5 | | |
| 6 | −7.938 | 0.85 | 1.60687 | 27.03 |
| 7 | aspherical surface | D7 | | |
| 8 | 17.188 | 0.97 | 1.52542 | 55.78 |
| 9 | aspherical surface | 0.84 | | |
| 10 | ∞ | 0.50 | 1.51633 | 64.14 |
| 11 | ∞ | | | |

Table 6 shows the aspherical surface coefficients and the like of the optical members of the changing-magnification optical system in FIG. 16.

TABLE 6

| Surface Number | R | K | A4 | A6 | A8 |
|---|---|---|---|---|---|
| 1 | −9.515 | −67.619 | −2.43422 × 10⁻² | 5.34186 × 10⁻³ | −3.51682 × 10⁻⁴ |
| 2 | 4.476 | 2.631 | −2.13081 × 10⁻² | 2.77511 × 10⁻³ | 6.72188 × 10⁻⁴ |
| 4 | 1.936 | −1.160 | 8.59308 × 10⁻³ | −3.49565 × 10⁻³ | 3.20388 × 10⁻³ |
| 5 | −2.690 | 1.204 | 4.62336 × 10⁻² | −9.56097 × 10⁻³ | 6.26226 × 10⁻³ |
| 7 | 2.046 | 0.381 | −1.42542 × 10⁻² | 1.86694 × 10⁻² | −2.13946 × 10⁻³ |
| 9 | −3.286 | −2.597 | 3.50384 × 10⁻³ | −1.30969 × 10⁻³ | −3.18189 × 10⁻⁴ |

Table 7 shows the zoom data of the changing-magnification optical system in FIG. 16.

TABLE 7

| | Wide-angle (1.3 M) | Wide-angle (VGA) | Standard | Telephoto |
|---|---|---|---|---|
| Focal Length | 3.123 | 3.123 | 4.988 | 8.640 |
| FNO. | 2.80 | 2.80 | 3.70 | 4.92 |
| D2 | 3.99 | 3.99 | 2.29 | 0.42 |
| D5 | 0.57 | 0.57 | 0.59 | 0.89 |
| D7 | 1.10 | 1.10 | 2.77 | 4.35 |

In this embodiment of the changing-magnification optical system described above, all the lenses are manufactured by using a resin material. Obviously, however, they may be manufactured by using a glass or organic-inorganic composite material.

As shown in FIG. 3, since the capture area on the electronic imaging device has a VGA size in states other than a state at the wide-angle end, a changing-magnification optical system may be designed to form an image in this size. In the lens arrangement in this embodiment, the ray height on the final lens surface (surface number 9) in a state at the wide-angle end is lower than the ray height for the formation of an image on the entire surface of an electronic imaging device with 1.3M at the wide-angle end. In addition, when, on the final lens surface, an area in which peripheral light amount ratio (the light amount at an edge on the image forming plane with respect to the light amount at its center) is 20% or more is regarded as an effective area, the effective area at the telephoto end is smaller than that at the wide-angle end.

In each of the changing-magnification optical systems in FIGS. 11 and 16, a diagonal length h of the imaging plane, a distance l between the image plane at the telephoto end and the exit pupil, an effective radius r within which the final lens contributes to the formation of an image, and an optical path length d from the image forming plane to the final lens surface satisfy the following relation:

$$\left(h - \frac{dh}{l}\right) > 2r. \quad (13)$$

In this case, the principal plane of the final lens (group) may be used in place of the final lens surface. Letting d' be the optical path length from the image forming plane to the rear principal plane of the final lens group, the optical path length satisfies $$\left(h - \frac{d'h}{l}\right) > 2r. \quad (14)$$

In the changing-magnification optical system in FIG. 11 (4-element/3-group construction), the left hand sides of equations (13) and (14) are respectively given by $$\left(h - \frac{dh}{l}\right) = 4.56, \quad (15)$$

$$\left(h - \frac{d'h}{l}\right) = 4.55. \quad (16)$$

Since the right hand sides of equations (13) and (14) are 2r=3.4, both equations (13) and (14) hold.

In addition, in the changing-magnification optical system according to the second embodiment (4-element/4-group construction), the left hand sides of equations (13) and (14) are respectively given by $$\left(h - \frac{dh}{l}\right) = 4.31, \quad (17)$$

$$\left(h - \frac{d'h}{1}\right) = 4.30. \quad (18)$$

On the other hand, since the right hand sides of equations (13) and (14) are 2r=4.0, both equations (13) and (14) hold.

According to the optical designs in FIGS. 11 and 16, the exit pupil distance at the telephoto end is larger than that at the wide-angle end, and the exit angle at the telephoto end is smaller. In this case, in order to form an image up to its periphery at the telephoto end, a lens larger in diameter than that at the wide-angle end is required as the final lens. However, as shown in FIG. 3, according to the arrangement of the present invention, since the range of the imaging plane required to obtain an output image at the telephoto end is a partial area around the optical axis, the lens system can be designed small as in the designs shown in FIGS. 11 and 16. Therefore, equations (13) and (14) hold. In addition, reducing the lens diameter makes it possible to reduce the thickness of the final lens. In the general design of a zoom lens, it is necessary to make a design for the acquisition of good images at all image heights from the wide-angle end to the telephoto end. In order to make a design at the telephoto end, in particular, in consideration of up to peripheral areas, consideration must be given to the correction of coma and curvature of field. For this reason, it is necessary to increase the number of lenses and add aspherical surfaces for the correction.

Performing such optical design makes it possible to reduce the number of lens groups, decrease the thickness of the final lens, and decrease the optical path length of the overall optical system.

Figure 21:
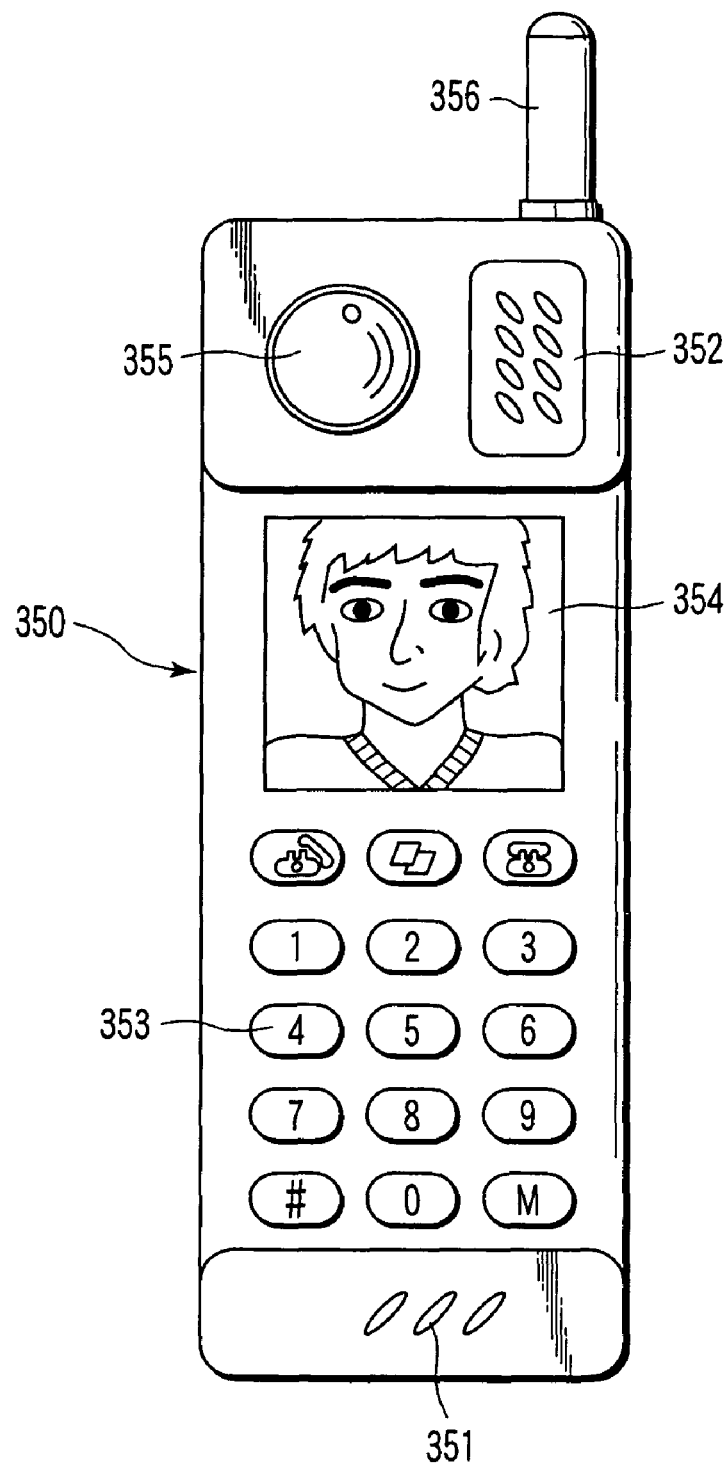
FIG. 21 is a view showing a cellular phone to which the imaging apparatus of the embodiment of the present invention is applied.

FIG. 21 shows a cellular phone to which the imaging apparatus of this embodiment is applied. As shown in FIG. 21, a cellular phone 350 is provided with a microphone 351, loudspeaker 352, button 353, display device 354, imaging apparatus 355, and antenna 356. The imaging apparatus 355 is formed very compact by using the advantage of being capable of miniaturizing the image forming optical system, and hence is housed in the cellular phone 350 by using a dead space without requiring any large design change.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging apparatus that samples an optically formed image using an electronic imaging device to acquire the image as image data, the imaging apparatus comprising:
   an optical zoom portion that optically changes a magnification of the image; and
   an electronic zoom portion that changes a size of the image by electrical signal processing;
   wherein the electronic zoom portion at least operates when the optical zoom portion is not set at a telephoto end, so that a total magnification is determined by changing a magnification of the optical zoom portion and changing a magnification of the electronic zoom portion, and a pixel count s1 of the electronic imaging device, a pixel count s2 of a rectangle including pixels on the electronic imaging device that is used by the electronic zoom portion, and a pixel count s3 of an output satisfy s1≧s2>s3 or s1>s2≧s3; and
   wherein a focal length $f_t$ of an optical zoom at the telephoto end, a focal length $f_w$ at a wide-angle end, and a focal length f with the use of electronic zoom satisfy $$\frac{f_w}{f_t} \le \frac{f}{f_t} < 1.$$

2. An apparatus according to claim 1, wherein the optical zoom portion comprises an optical system in which a ray height on a final lens surface at the wide-angle end is larger than a ray height at the telephoto end.

3. An apparatus according to claim 1, wherein a number of clocks for reading out pixels on the electronic imaging device is constant regardless of a size of the rectangle.

4. An apparatus according to claim 1, wherein when, on a final lens surface, an area in which a peripheral light amount ratio is 20% or more is regarded as an effective area, the optical zoom portion comprises an optical system in which an effective area at the telephoto end is smaller than that at the wide-angle end.

5. An apparatus according to claim 1, wherein a diagonal length h of an imaging plane of the optical zoom portion, an optical path length l between an image plane at the telephoto end and an exit pupil, an effective radius r within which a final lens contributes to image formation, and an optical path length d from an image forming plane to the final lens satisfy $$\left(h - \frac{dh}{l}\right) > 2r.$$

6. An apparatus according to claim 1, wherein a diagonal length h of an imaging plane of the optical zoom portion, an optical path length l between an image plane at the telephoto end and an exit pupil, an effective radius r within which a final lens contributes to image formation, and an optical path length d' from an image forming plane to a rear principal plane of the final lens satisfy $$\left(h - \frac{d'h}{l}\right) > 2r.$$

7. An apparatus according to claim 1, wherein the optical zoom portion comprises an optical system including a first lens group having negative refracting power, a second lens group having positive refracting power, and a third lens group having positive refracting power, which are sequentially arranged from an object side.

8. An apparatus according to claim 7, wherein the first lens group comprises a negative lens, the second lens group comprises a positive lens and a negative lens, and the third lens group comprises a positive meniscus lens having a concave surface facing the object side.

9. An apparatus according to claim 1, wherein the optical zoom portion comprises an optical system including a first lens group having negative refracting power, a second lens group having positive refracting power, a third lens group having negative refracting power, and a fourth lens group having positive refracting power, which are sequentially arranged from an object side.

10. An apparatus according to claim 9, wherein the first lens group comprises a negative lens, the second lens group comprises a positive lens, the third lens group comprises a negative lens, and the fourth lens group comprises a positive lens.

11. An apparatus according to claim 3, wherein the electronic zoom portion changes a size of a readout area so as to gradually decrease the readout area while a magnification of the optical zoom portion is fixed, thereby finally reading out all pixels in a block by using clocks equal in number to the pixels.

12. An apparatus according to claim 3, wherein the electronic zoom portion performs at least one of a pixel mixture readout operation and a pixel thinning-out readout operation of the electronic imaging device.

13. An apparatus according to claim 12, wherein the electronic zoom portion further performs changing-magnification processing by using all or part of readout image data.

14. An apparatus according to claim 12, wherein the electronic zoom portion performs distortion correction processing by a thinning-out readout operation after the thinning-out readout operation of the electronic imaging device.

15. An apparatus according to claim 14, wherein the distortion correction processing is pixel computation processing within a same frame.

16. An apparatus according to claim 14, wherein frames are imaged, and the distortion correction processing is pixel computation processing between different frames.

17. An apparatus according to claim 16, wherein different thinning-out readout rules are used for adjacent frames.

18. An apparatus according to claim 16, wherein the same thinning-out readout rule is used for adjacent frames, and different thinning-out readout start positions are set for different frames.

* * * * *